United States Patent
Yu

(10) Patent No.: US 10,404,919 B2
(45) Date of Patent: Sep. 3, 2019

(54) ELECTRONIC DEVICE INCLUDING CAMERA MODULE WITH CIRCUIT BOARD OPENING AND OPTICAL IMAGE STABILIZATION

(71) Applicant: Samsung Electronics Co., Ltd., Suwon-si (KR)

(72) Inventor: Young-Bok Yu, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/581,488

(22) Filed: Apr. 28, 2017

(65) Prior Publication Data

US 2017/0324905 A1  Nov. 9, 2017

(30) Foreign Application Priority Data

May 3, 2016 (KR) .................. 10-2016-0054787

(51) Int. Cl.
*G02B 7/09* (2006.01)
*G02B 7/10* (2006.01)
*G02B 27/64* (2006.01)
*H04N 5/225* (2006.01)
*H04N 5/232* (2006.01)

(52) U.S. Cl.
CPC ........... *H04N 5/23287* (2013.01); *G02B 7/09* (2013.01); *G02B 7/102* (2013.01); *G02B 27/646* (2013.01); *H04N 5/2253* (2013.01); *H04N 5/2254* (2013.01); *H04N 5/2257* (2013.01); *H04N 5/23212* (2013.01); *H04N 5/23258* (2013.01)

(58) Field of Classification Search
CPC .. H04N 5/2253; H04N 5/2254; H04N 5/2257; H04N 5/23258; H04N 5/23287; G02B 7/09

See application file for complete search history.

(56) References Cited

U.S. PATENT DOCUMENTS

| 7,847,824 B2 | 12/2010 | Mogamiya |
| 2006/0061660 A1* | 3/2006 | Brackmann .......... H04N 5/2253 348/208.1 |
| 2006/0070302 A1 | 4/2006 | Seo |
| 2007/0257989 A1 | 11/2007 | Shirono |
| 2008/0225126 A1 | 9/2008 | Mogamiya |

(Continued)

FOREIGN PATENT DOCUMENTS

| JP | 2008-225135 A | 9/2008 |
| JP | 2011-081417 A | 4/2011 |

(Continued)

OTHER PUBLICATIONS

International Search Report and Written Opinion for International Application No. PCT/KR2017/004681, dated Aug. 8, 2017. (11 pages).

(Continued)

*Primary Examiner* — Nicholas G Giles

(57) ABSTRACT

An electronic device includes a camera module, a board, and a first member fixed to the board. A second member is movably connected to the first member, and formed in at least a portion of the first member. A control member is connected to the first member and the second member so as to control the second member in response to a movement of the electronic device.

8 Claims, 13 Drawing Sheets

(56) References Cited

U.S. PATENT DOCUMENTS

| | | | | | |
|---|---|---|---|---|---|
| 2009/0219402 | A1* | 9/2009 | Schneider | | G03B 17/00 348/208.7 |
| 2011/0150442 | A1* | 6/2011 | Ollila | | G03B 3/10 396/55 |
| 2013/0076924 | A1* | 3/2013 | Wade | | G03B 5/02 348/208.11 |
| 2013/0077945 | A1* | 3/2013 | Liu | | G02B 26/0841 396/55 |
| 2013/0100304 | A1* | 4/2013 | Wade | | G03B 5/00 348/208.4 |
| 2013/0182325 | A1* | 7/2013 | Minamisawa | | G03B 5/00 359/554 |
| 2014/0009631 | A1* | 1/2014 | Topliss | | G02B 27/646 348/208.11 |
| 2014/0139693 | A1* | 5/2014 | Takei | | G03B 5/00 348/208.11 |
| 2015/0043076 | A1* | 2/2015 | Nakayama | | G02B 27/646 359/557 |
| 2015/0138639 | A1 | 5/2015 | Lim et al. | | |
| 2015/0350500 | A1 | 12/2015 | Gutierrez et al. | | |
| 2016/0033786 | A1 | 2/2016 | Kim et al. | | |
| 2016/0085086 | A1* | 3/2016 | Rho | | G02B 27/646 348/208.99 |
| 2016/0127646 | A1* | 5/2016 | Osborne | | H04N 5/2251 348/208.2 |
| 2016/0154249 | A1* | 6/2016 | Yeo | | G03B 5/00 359/208.11 |

FOREIGN PATENT DOCUMENTS

| | | |
|---|---|---|
| JP | 2013-160806 A | 8/2013 |
| KR | 10-2014-0144126 A | 12/2014 |
| WO | 2013-175197 | 11/2013 |
| WO | 2015111884 A1 | 7/2015 |

OTHER PUBLICATIONS

European Patent Office, "Supplementary European Search Report," Application No. EP17792900.7, dated Mar. 14, 2019, 7 pages.

\* cited by examiner

# ELECTRONIC DEVICE INCLUDING CAMERA MODULE WITH CIRCUIT BOARD OPENING AND OPTICAL IMAGE STABILIZATION

CROSS-REFERENCE TO RELATED APPLICATION(S) AND CLAIM OF PRIORITY

The present application is related to and claims the priority under 35 U.S.C. § 119(a) to Korean Application Serial No. 10-2016-0054787, which was filed in the Korean Intellectual Property Office on May 3, 2016, the entire content of which is hereby incorporated by reference.

TECHNICAL FIELD

Various embodiments of the present disclosure relate to a portable electronic device that includes a camera module.

BACKGROUND

Recently, mobile terminals, such as smart phones, which are becoming popular due to the development of the mobile communication technology, have adopted one or more camera modules in the bodies of the portable terminals as the camera modules have become smaller and lighter.

Recent portable terminals require a camera module with high capacity and high performance. Due to this, camera modules having various functions similar to a digital camera (DSLR) class are being actively developed. Various functions incorporated in the camera modules equipped in the portable terminals include an Optical Image Stabilization (OIS) function in addition to an auto focus function and a zoom function.

Such an OIS function refers to a technique for compensating for the shake of a subject image due to the vibration of a human body, such as a hand shake of a user, during photographing. Such an OIS function can be performed, for example, by detecting a vibration applied to an electronic device, such as a camera, through a plurality of angular velocity sensors equipped in the electronic device, and by moving a lens or an image sensor according to the angular velocity and direction of the detected vibration.

SUMMARY

To address the above-discussed deficiencies, it is an object to provide a camera module having the OIS function with a structure in which an Auto Focus (AF) actuator and an OIS actuator are stacked on the top side of a Printed Circuit Board (PCB) that is provided with an image sensor. Thus, there is a difficulty in reducing the thickness of the camera module by the height of a bracket on which the OIS actuator is positioned.

That is, since the conventional camera module has a structure in which the AF actuator and the OIS actuator are arranged in series in a stack, the thickness of a product is increased, which hinders the miniaturization or slimming of the product.

Therefore, various embodiments of the present disclosure are to provide an electronic device including a camera module that enables the thickness of a product to be reduced so that the product can be made to be smaller or slimmer by forming, in a board and an OIS actuator, at least one opening capable of accommodating an image sensor.

According to various embodiments of the present disclosure, an electronic device may include: a board; a first member fixed to the board; a second member movably connected to the first member, and formed in at least a portion of the first member; and a control member connected to the first member and the second member so as to control the second member in response to a movement of the electronic device.

According to various embodiments of the present disclosure, an electronic device that includes a camera module may further include: a lens unit; a board including a first opening; an image sensor carrier including an image sensor that moves in a first direction (X,Y-axis direction); an optical image stabilization actuator that receives the image sensor carrier and moves the image sensor carrier in the first direction (X,Y axis-direction); and at least one AF actuator provided on the image sensor to move the lens unit in a second direction (Z-axis direction). The image sensor carrier may be arranged such that the image sensor may be received in the first opening through the optical image stabilization actuator.

According to various embodiments of the present disclosure, an electronic device that includes a camera module may further include: a lens unit; a board including a first opening; an optical image stabilization actuator provided on the first opening, and including a third opening to move the lens unit in a first direction (X,Y-axis direction); an image sensor received in the first opening and coupled through the third opening; and at least one auto-focusing actuator provided on the image sensor to move the lens unit in a second direction (Z-axis direction).

According to various embodiments of the present disclosure, at least one opening that accommodates an image sensor carrier including an image sensor is formed in a board or an OIS actuator or at least one opening that directly accommodates an image sensor is formed in the board and the OIS actuator so that the image sensor is accommodated in the board or the OIS actuator. Thus, as compared to the existing product, which is provided by being stacked on the top side of the board, the thickness of the product can be reduced so as to make the product smaller and slimmer, and the product can be manufactured to be compact and thin.

The first member electrically connected to the control members to apply power to the control members is configured to be electrically connectable to the control members without separate soldering from the outside so that it is possible not only to reduce the number of soldering steps of a product, but also to reduce a manufacturing cost.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
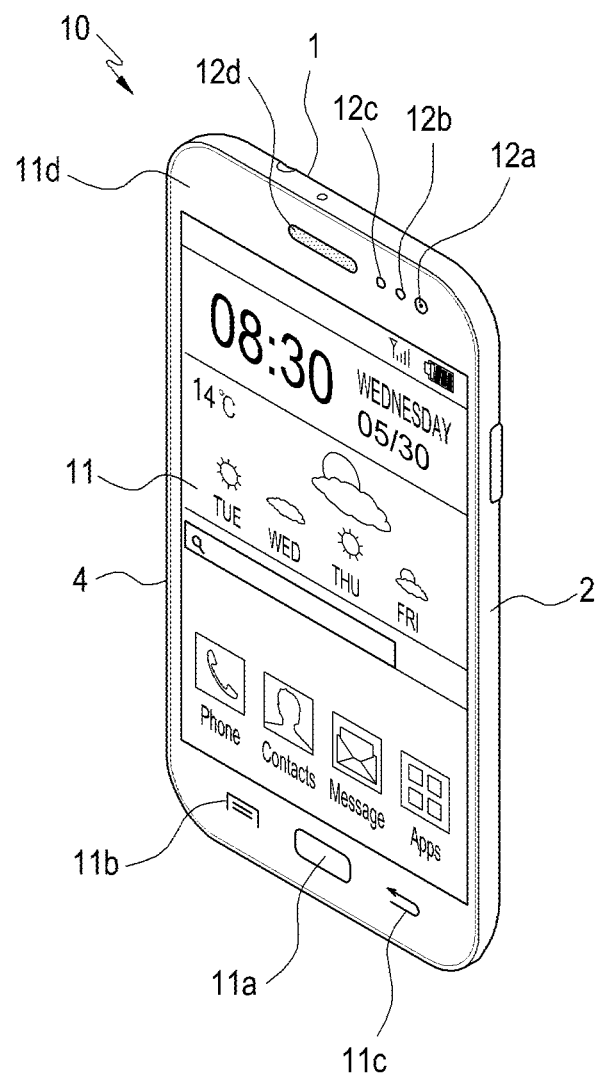
FIG. 1 is a perspective view illustrating the front face of an electronic device that is provided with a camera module according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, terms defined in this specification may not be interpreted as excluding embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR) , a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Figure 2:
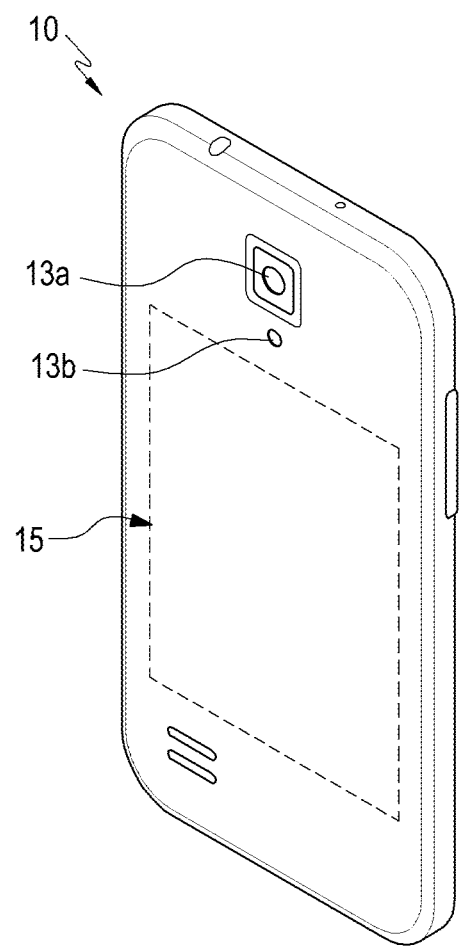
FIG. 2 is a perspective view illustrating the rear face of an electronic device that is provided with a camera module according to various embodiments of the present disclosure.

FIG. 1 is a perspective view illustrating the front face of an electronic device. FIG. 2 is a perspective view illustrating the rear face of the electronic device. The electronic device 10 may be a smart phone or a wearable device. Components of an electronic device, such as a smart phone, will be described with reference to FIGS. 1 and 2.

As illustrated in FIG. 1, an electronic device 10 may include a touch screen 11 that is disposed on the center of the front face thereof. The touch screen 11 may occupy a great portion of the front face of the electronic device 10. FIG. 1 illustrates an example in which a main home screen is displayed on the touch screen 11. The main home screen refers to the first screen that is displayed on the touch screen 11 when the power of the electronic device 10 is turned on. In addition, when the electronic device 10 has several pages of different home screens, the main home screen may be the first home screen among the several pages of home screens. The home screen may display shortcut icons to execute frequently used applications, a main menu switching key, time, weather, or the like. The main menu switching key may cause a menu screen to be displayed on the touch screen 11. In addition, in the upper end of the touch screen 11, status bars 11d may be formed to indicate the statuses of the device, such as a battery charge status, a received signal strength, and the current time. Below the touch screen 11, a home key 11a, a menu button 11b, and a back button 11c may be formed.

The home key 11a may cause the main home screen to be displayed on the touch screen 11. For example, when the home key 11a is touched in the state where any home screen, which is different from the main home screen, or the menu screen is displayed on the touch screen 11, the main home screen may be displayed on the touch screen 11. In addition, when the home key 11a is touched while applications are being executed on the touch screen 11, the main home screen may be displayed on the touch screen 11. In addition, the home key 11a may be used for causing the most recently used application or a task manager to be displayed on the touch screen 11. The menu button 11b may provide a connection menu that is capable of being used on the touch screen 11. The connection menu may include, for example, a widget addition menu, a background screen change menu, a retrieve menu, an edition menu, or an environment setting menu. The back button 11c may cause the screen, which has been executed just prior to the currently executed screen, to be displayed, or may cause the most recently used application to be terminated.

According to various embodiments, as illustrated in FIG. 1 described above, a first camera 12a, an illuminance sensor 12b, or a proximity sensor 12c may be arranged in the upper end region of the front face of the electronic device 10.

As illustrated in FIG. 2, a second camera 13a, a flash 13b, or a speaker 13c may be arranged on the rear face of the electronic device 10. When the electronic device 10 is configured such that a battery pack is detachably mounted thereon, the rear face of the electronic device 10 may be a detachable battery cover 15.

An electronic device 10 within the network environment 100, in various embodiments, will be described with reference to FIG. 3. The electronic device 10 may include a bus 110, a processor 120, a memory 130, an input/output interface 150, a display 160, and a communication interface 170. In a certain embodiment, at least one of the above-mentioned components may be omitted from the electronic device 10 or the electronic device 10 may additionally include other components.

The bus 110 may include, for example, a circuit that interconnects the above-mentioned components 110 to 170 and transmits communication (e.g., a control message or data) among the components.

The processor 120 may include one or more of a Central Processing Unit (CPU), an Application Processor (AP), and a Communication Processor (CP). The processor 120 may execute, for example, an arithmetic operation or data processing that is related to a control and/or communication of one or more other components of the electronic device 10.

The memory 130 may include a volatile memory and/or a non-volatile memory. The memory 130 may store, for example, commands or data that are related to one or more other components of the electronic device 10. According to one embodiment, the memory 130 may store software and/or a program 140. The program 140 may include, for example, a kernel 141, a middleware 143, an Application Programming Interface (API) 145, and/or an application program (or an "application") 147. At least one of the kernel 141, the middleware 143, and the API 145 may be referred to as an Operating System (OS).

The kernel 141 may control or manage, for example, system resources (e.g., the bus 110, the processor 120, or the memory 130) that are used for executing operations or functions implemented in the other programs (e.g., the middleware 143, the API 145, or the application program 147). In addition, the kernel 141 may provide an interface that allows the middleware 143, the API 145, or the application programs 147 to access individual components of the electronic device 10 so as to control or manage the system resources.

The middleware 143 may play an intermediary role such that, for example, the API 145 or the application programs 147 may communicate with the kernel 141 so as to exchange data.

In addition, the middleware 143 may process one or more task requests which are received from the application programs 147, according to priority. For example, the middleware 143 may assign the priority to be capable of using a system resource of the electronic device 10 (e.g., the bus 110, the processor 120, or the memory 130) to at least one of the application programs 147. For example, the middleware 143 may perform scheduling, load balancing, or the like for the one or more task requests by processing the one or more requests according to the assigned priority.

The API 145 is, for example, an interface that allows the applications 147 to control functions provided from the kernel 141 or the middleware 143, and may include, for example, one or more interfaces or functions (e.g., commands) for a file control, a window control, an image processing, or a character control.

The input/output interface 150 may serve as an interface to transmit commands or data, which are entered from, for example, a user or any other external device, to the other component(s) of the electronic device 10. Also, the input/output interface 150 may output commands or data, which are received from the other component(s) of the electronic device 10, to the user or the other external device.

The display 160 may include, for example, a Liquid Crystal Display (LCD), a Light Emitting Diode (LED) display, an Organic Light Emitting Diode (OLED) display, or a MicroElectroMechanical System (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 10 and an external device (e.g., a first external electronic device 102, a second external device 104, or a server 106). For example, the communication interface 170 may be connected with a network 162 through wired or wireless communication so as to communicate with the external device (e.g., the second external electronic device 104 or the server 106).

The wireless communication may include a cellular communication that uses at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), and Global System for Mobile communication (GSM). According to one embodiment, the wireless communication may include at least one of, for example, Wireless Fidelity (WiFi), Bluetooth, Bluetooth Low Energy (BLE), ZigBee, Near Field Communication (NFC), Magnetic Secure Transmission, Radio Frequency (RF), and Body Area Network (BAN). According to one embodiment, the wireless communication may include GNSS. The GNSS may include, for example, at least one of Global Positioning System (GPS), Global Navigation Satellite System (Glonass), Beidou Navigation Satellite System (hereinafter, "Beidou"), Galileo, and the European global satellite-based navigation system. Herein, "GPS" may be interchangeably used with "GNSS" below. The wired communication may use at least one of, for example, Universal Serial Bus (USB), High Definition Multimedia Interface (HDMI), Recommended Standard 232 (RS-232), and Plain Old Telephone Service (POTS). The network 162 may include a telecommunication network, for example, at least one of a computer network (e.g., LAN or WAN), the internet, and a telephone network.

Each of the first and second external electronic devices 102 and 104 may be the same type as or different from the electronic device 10. According to one embodiment, the server 106 may include a group of one or more servers. According to various embodiments, all or some of the operations to be executed by the electronic device 10 may be executed in another electronic device or a plurality of other electronic devices (e.g., the electronic devices 102 and 104 or the server 106). According to one embodiment, in the case where the electronic device 10 should perform a certain function or service automatically or by a request, the electronic device 10 may request some functions or services that are associated therewith from the other electronic devices (e.g., the electronic devices 102 and 104 or the server 106), instead of, or in addition to, executing the functions or service by itself. The other electronic devices (e.g., the electronic devices 102 and 104 or the server 106) may execute the requested functions or additional functions, and may deliver the results to the electronic device 10. The electronic device 10 may provide the requested functions or services by processing the received results as they are or additionally. For this purpose, for example, a cloud computing technique, a distributed computing technique, or a client-server computing technique may be used.

The electronic device 10 to be described below may be formed of any one of the above-mentioned wearable device, a notebook computer, a notebook computer, a smart phone, a tablet PC, Galaxy Tab, I-Pad, and a wireless charging device. In the present embodiment, the electronic device 10 may be formed as a smart phone.

The wireless charging device according to various embodiments of the present disclosure refers to a device that wirelessly transmits/receives power within a short distance to charge the electronic device.

In addition, in the electronic device, a bezel region may be minimized to implement the design luxuriously while somewhat increasing a display unit of the electronic device, or a flexible display unit may be provided in order to implement a convex or concave display unit.

That is, a peripheral portion of the display unit may be bent, and a view area may be provided to be used in a state where the view area is enlarged to a side face portion of the display unit. As a view area of the display unit is bent and provided to the side face portion thereof, it is possible to use the view area in an enlarged state, or to use a separate screen on the side face portion, and it is also possible to implement the design luxuriously. According to one embodiment, the display unit may include a first view area, and second view areas provided on the opposite sides of the first screen area.

In addition, the camera module 400 applied to the electronic device 10 may be a camera module provided with an OIS function. In the present embodiment, the camera module described above is described by way of example, but the present embodiment is not limited thereto. That is, the camera module 400 is variously applicable as long as it is a camera module that drives a lens by a driving unit. Here, in the present embodiment, while a sensor driving type camera module and a lens driving type camera module are applied, descriptions will be made first with reference to a case in which the sensor driving type camera module 400 is applied.

In the following, descriptions will be made in detail with reference to a configuration of the sensor driving type camera module 200 provided in the electronic device 10 according to various embodiments of the present disclosure.

Figure 4:
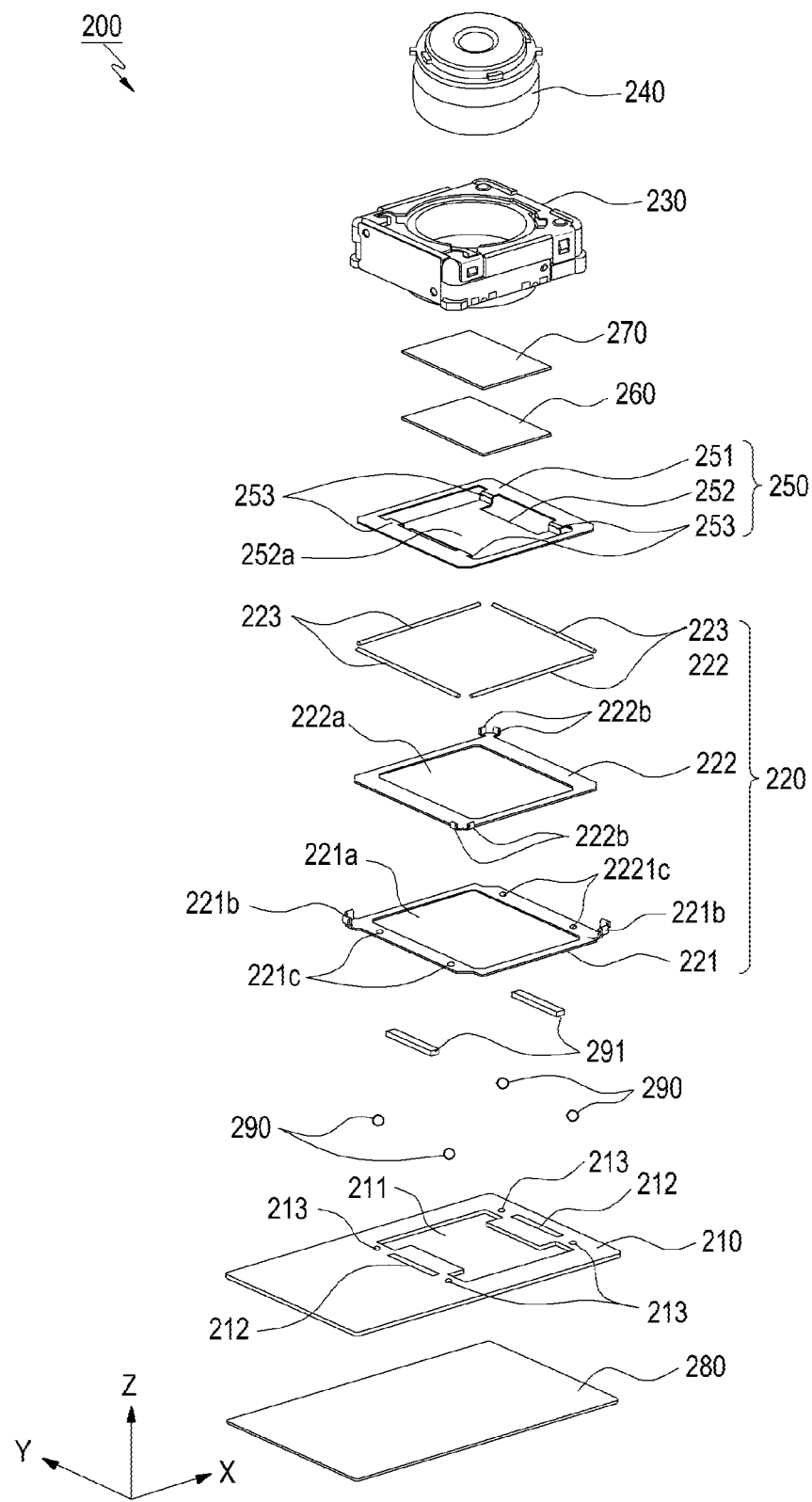
FIG. 4 is an exploded perspective view illustrating a configuration of a camera module according to various embodiments of the present disclosure.

FIG. 4 is an exploded perspective view illustrating a configuration of the sensor driving type camera module 200 according to various embodiments of the present disclosure.

The sensor driving type camera module 200 may include, for example, a board 210 including a first opening 211, an OIS actuator 220 including second and third openings 221a and 222a, an image sensor carrier 250 including an image sensor 260, and an AF actuator 230 receiving a lens unit 240. The lens unit 240 may be driven in a second direction (e.g., "Z-axis direction") or a first direction (e.g., "X,Y-axis direction") by the OIS actuator 220 or the AF actuator 230. The image sensor carrier 250 may be driven in the first direction (e.g., X,Y axis-direction) by the OIS actuator 220 to be described later. The OIS actuator 220 may be provided on the board 210 to drive the image sensor carrier 250 in the first direction (e.g., X,Y-axis direction) so as to correct the camera shake. For example, the OIS actuator 220 may correct the camera shake by driving the image sensor carrier 250 in the first direction (X,Y-axis direction). The AF actuator 230 may be provided on the OIS actuator 220 to drive the lens unit 240 in the second direction (e.g., Z-axis direction).

The Z-axis direction is described as an example of the second direction, and the second direction may be described as another axial direction other than the Z-axis direction. Similarly, the first direction may also be described as an axial direction other than the X,Y-axis direction.

According to various embodiments of the present disclosure, the second direction may be referred to as a "Z-axis direction" and the first direction may be referred to as an "X,Y-axis direction."

As described above, the image sensor carrier 250 including the image sensor 260 is accommodated in the first opening 211 of the board 210 and the second and third openings 221a and 222a of the OIS actuator 220, so that the image sensor 260 can be accommodated in the board 210, thereby reducing the thickness of the product to make the product smaller or slimmer.

An IR filter may be provided on the upper surface of the image sensor 260 so as to block a portion of the light entering the camera module 200, which has a wavelength shorter than that of the red color in visible light ray.

According to one embodiment, the configuration of the OIS actuator 220 will be described in more detail.

Figure 5:
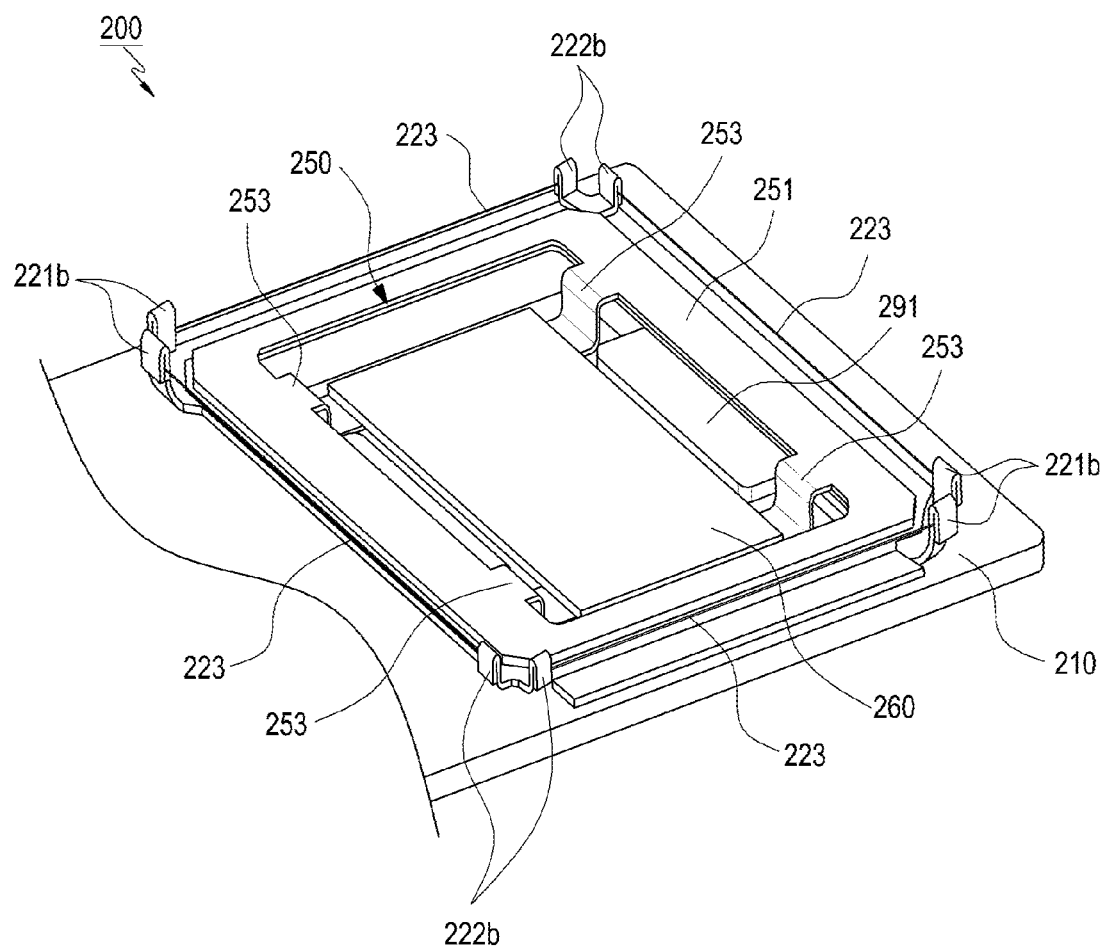
FIG. 5 is a perspective view illustrating a state of a board, an OIS actuator, and an image sensor carrier after assembly in the configuration of the camera module according to various embodiments of the present disclosure.
Figure 6:
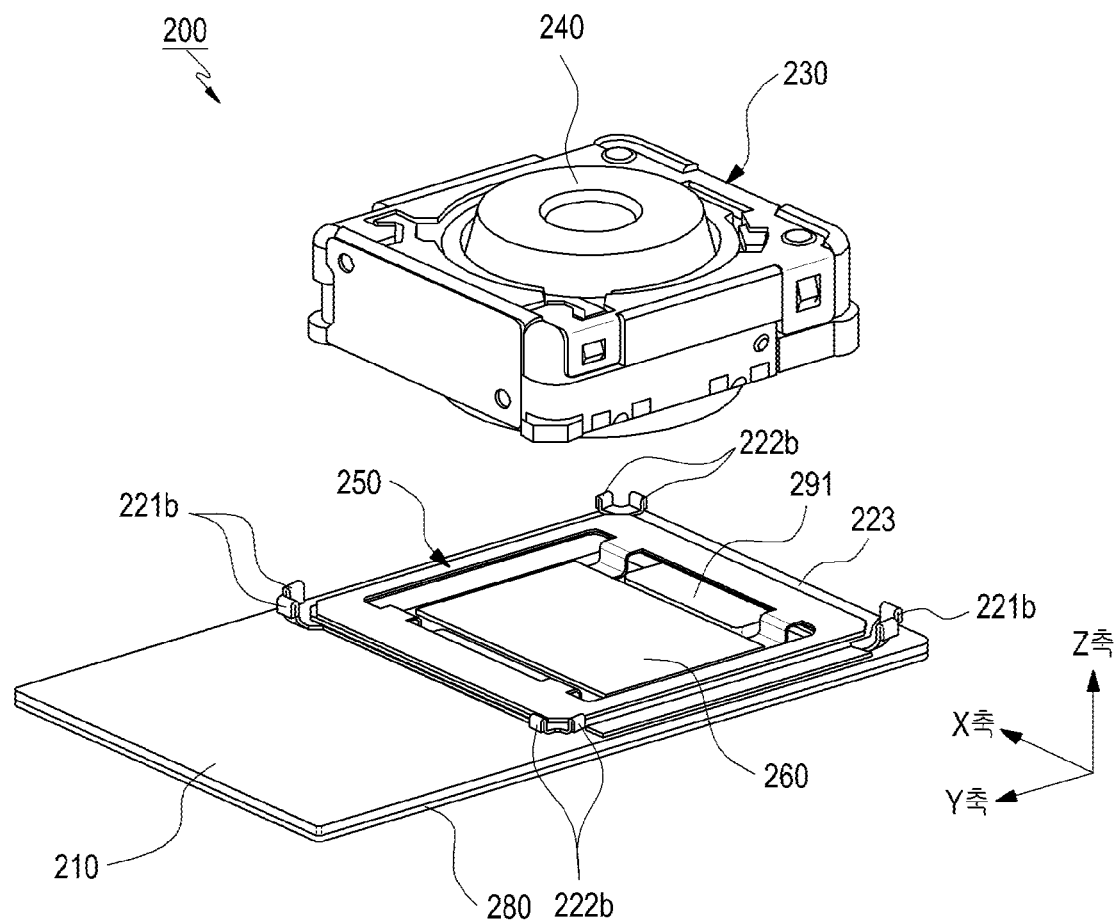
FIG. 6 is a perspective view illustrating a state of the OIS actuator and the AF actuator before assembly in the configuration of the camera module according to various embodiments of the present disclosure.
Figure 7:
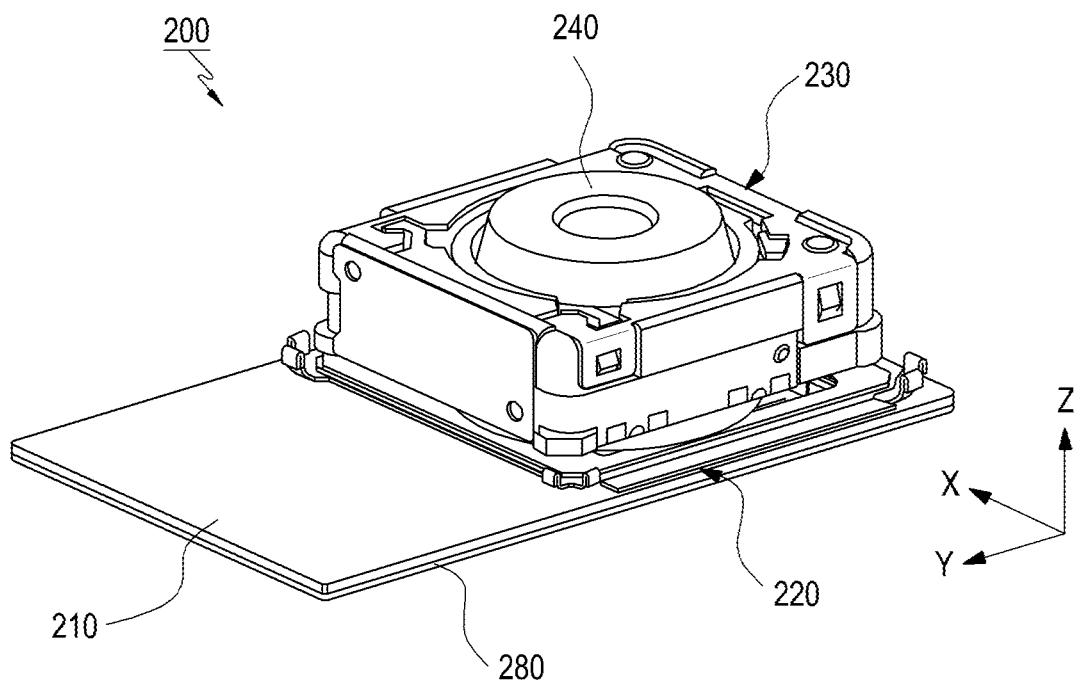
FIG. 7 is a perspective view illustrating a state of the OIS actuator and the AF actuator after assembly in the configuration of the camera module according to various embodiments of the present disclosure.

FIG. 5 is a perspective view illustrating a state of the board 210, the OIS actuator 220, and the image sensor carrier 250 after assembly in the configuration of the camera module 200 according to various embodiments of the present disclosure, FIG. 6 is a perspective view illustrating a state of the board 210, the OIS actuator 220, and the AF actuator 230 before assembly in the configuration of the camera module 200 according to various embodiments of the present disclosure, and FIG. 7 is a perspective view illustrating a state of the board 210, the OIS actuator 220, and the AF actuator 230 after assembly in the configuration of the camera module 200 according to various embodiments of the present disclosure.

First, as described above with reference to FIG. 4, the OIS actuator 220 may include, for example, first and second members 221 and 222 and one or more control members 223.

The first member 221 includes the second opening 221a, and may be fixed to the upper surface of the board 210 so as to support the movement of the second member 222 to be described later.

The second member 222 may movably face the upper surface of the first member 221. The second member 222 may include the third opening 222a, and may be superimposed on the first member 221.

The control members 223 may be connected to the first member 221 and the second member 222 to be contracted and relaxed in order to control the second member 222 in response to the movement of the electronic device.

For example, as illustrated in FIGS. 4 to 6, the first member 221 may be fixed to the outer periphery of the first opening 211 of the board 210. The first member 221 may have a second opening 221a formed to correspond to the first opening 211.

Accordingly, when the first member 221 is fixed to the upper surface of the board 210, the second opening 221a of the first member 221 may face the first opening 211 of the board 210 to form a penetration portion.

The second member 222 is movably disposed on the outer periphery of the first member 221 and a third opening 222a is formed in the second member 222. Thus, when the second member 222 is disposed to be superimposed on the first member 221, the second opening 221a of the first member 221 and the third opening 222a of the second member 222 may face each other to form a penetration portion.

For example, when the first member 221 is fixed to the upper surface of the board 210 and the second member 222 is movably disposed on the upper surface of the first member 221, the first opening 211 of the board 210 and second and third openings 221a and 222a of the first and second members 221 and 222 may face each other to form a penetration portion.

In this state, the image sensor carrier 250 including the image sensor 260 can be coupled within the first, second, and third openings 211, 221a, and 222a.

For example, when the first member 221 is electrically connected to the printed circuit board 210 and power is supplied to the first member 221, the control members 223 are contracted and relaxed so as to drive the second member 222 so that the camera shake can be corrected.

As another example, a base plate 280 may be provided on the rear face of the board 210 to support the board 210. The base plate 280 may be made of a metallic material.

According to one embodiment, the material of the one or more control members 223 may be a Shape Memory Alloy (SMA), and the one or more control members 223 may be made of an SMA wire. In the present embodiment, the one or more control members 223 are described with reference to an SMA by way of example, but are not limited thereto. That is, the one or more control members 223 may be variously applicable as long as the control members 223 are made of a material, the length of which can be controlled according to the application of power.

The SMA refers to an alloy having the following properties: an arrangement of crystals at a high temperature is different from an arrangement of crystals at a low temperature (e.g., at room temperature), and when the shape of the SMA is changed at a low temperature and then the SMA is heated to a predetermined temperature or higher, the SMA returns to a shape at the high temperature. According to one embodiment, when power is applied to the first member, the control members 223 are heated and change the length thereof by contraction and relaxation, thereby moving the second member 222 in the first direction (X,Y-axis direction).

For example, the first end of the one or more control members 223 may be fixedly coupled to the fixed portion 221b of the first member 221, and the second end of the one or more control members 223 may be coupled to a movable coupling portion 222b of the second member 222. Accordingly, the first end of the control member 223 is fixed to the first member 221 fixed to the board 210, and the second end of the control member 223 is coupled to the movable second member 222 so as to make the second member 222 movable.

In this way, the first member 221 is disposed on the board 210 and is electrically connected to the board 210. The first member 221 may transmit power supplied via the board 210 to the control members 223 to heat the control members 223 so that the control members 223 can be contracted and relaxed to change the length thereof, thereby moving the second member 222.

Accordingly, since the first member 221 does not require separate external soldering to the board 210 and the control members 223, it is possible to reduce the number of soldering steps, thereby reducing the manufacturing cost of the product.

As still another example, as illustrated in FIG. 7, the board 210 may be provided with one or more magnets 291 in order to seat the AF actuator 230, which receives the lens unit 240, on the image sensor carrier 250 by a magnetic force, and to return the image sensor carrier to the center position of the lens unit after the image sensor carrier is moved. The magnets may be seated in one or more magnet seat portions 212 to be capable of being seated on the board 210. For example, one or more magnet seat portions 212 may be formed on the board 210, and the magnets 291 may be seated on the magnet seat portions 212. In this state, the AF actuator 230 may be seated on the image sensor carrier 250 by the magnetic force of the magnets 291, and the lens unit 240 may be seated on the image sensor 260. As still another example, after the image sensor carrier is moved for optical image stabilization, the magnets 291 may provide a magnetic force to return the image sensor carrier to an initial position, which is the center position of the lens unit. As still another example, the function of the magnets may be replaced by an elastic member (e.g., a wire spring or a leaf spring). For example, a plurality of wire springs, which are elastic members for movement, are symmetrically arranged within the electronic device with the image sensor carrier such that the image sensor carrier may be moved in the first direction (X,Y-axis direction) and then returned to the initial position again by the elastic force of the elastic members. At this time, the elastic members may position the image sensor carrier at the center of the lens unit, which is the initial position.

According to one embodiment, between the second member 222 and the base plate 280, the through hole 213 for in the board 210 and the through hole 221c formed in the first member 221 may form a penetration portion, and one or more ball members 290 may be included to support the movement of the second member 222 while facing the rear face of the second member 222. For example, the ball members 290 may be provided to reduce frictional force between the second member 222 and the base plate 280 when the second member 222 is moved. For example, the one or more ball members 290 may be used as a method of smoothly moving or rolling the second member 222, or reducing the frictional force.

According to one embodiment, the OIS actuator 220 may be provided with at least one position sensor unit (not shown) in order to detect the moved position of the second member 222. The position sensor unit may be formed as an OIS side position sensor unit. As yet another example, the at least one position sensor unit may be disposed on a Printed Circuit Board (PCB) when the OIS actuator is provided a magnet.

As yet another example, the position sensor unit (not illustrated) may be made of, for example, a Hall sensor. Based on vibration information detected through an angular velocity sensor equipped in the electronic device (e.g., information on the amount and direction of shaking and the position information of the OIS actuator 220, which is detected from the position sensor unit), a processor 120 (see FIG. 3) provided in the electronic device 10 may control the movement of the control members 223 by applying a driving signal for correcting the camera shake to the control members 223 through the first member 221. The driving signal may be formed of a power or a current.

Figure 8A:
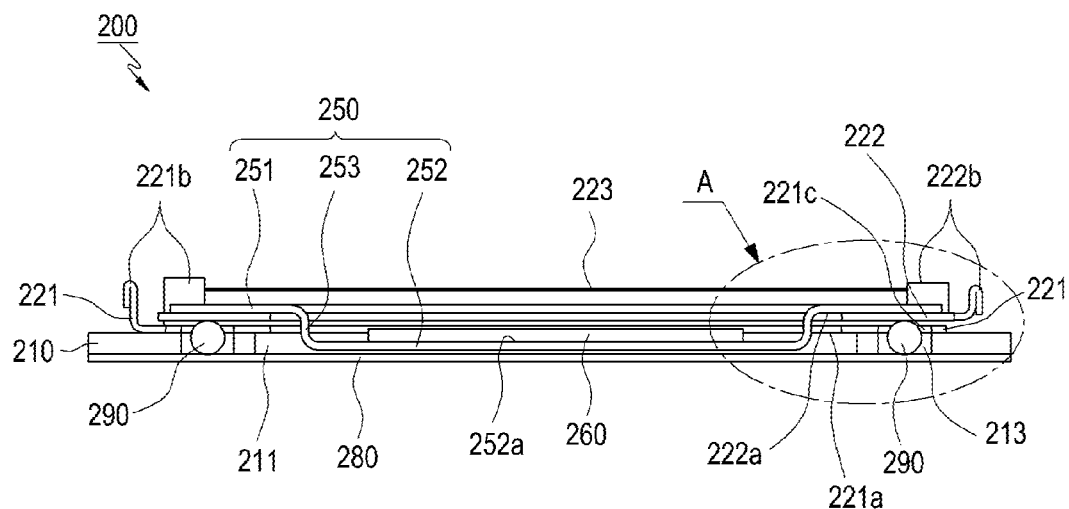
FIG. 8A is a side sectional view illustrating a state of the board, the OIS actuator, and the image sensor carrier after assembly in the configuration of the camera module according to various embodiments of the present disclosure.
Figure 8B:
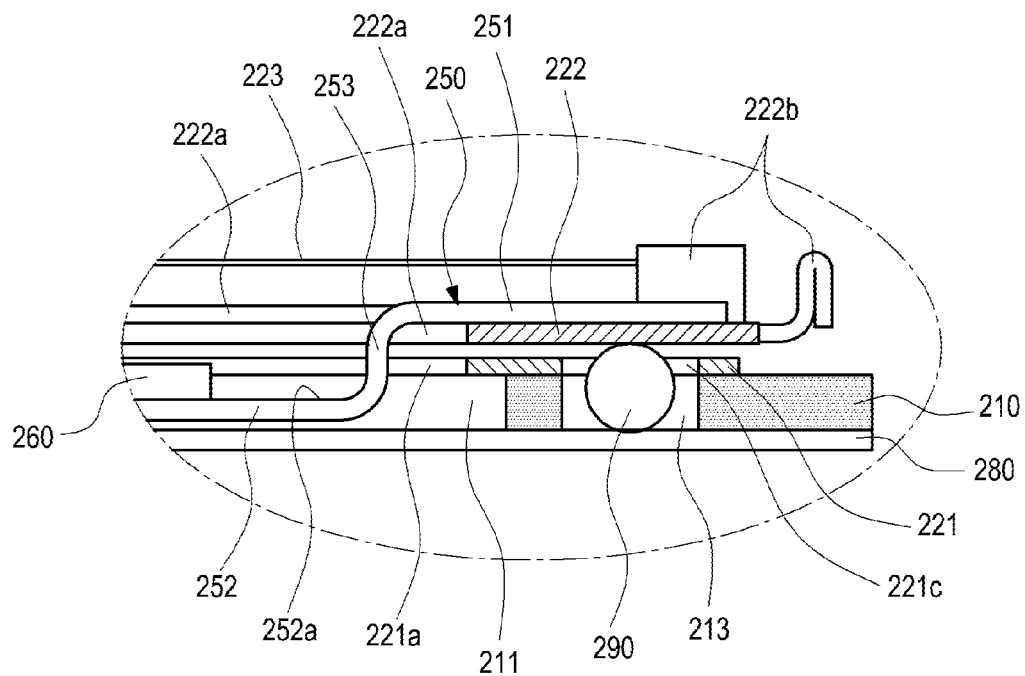
FIG. 8B is an enlarged side sectional view of "A" portion in FIG. 8A.

FIG. 8A is a side sectional view illustrating a state of the board 210, the OIS actuator 220, and the image sensor carrier 250 after assembly in the configuration of the sensor driving type camera module 200 according to various embodiments of the present disclosure, and FIG. 8B is an enlarged side sectional view of "A" portion in FIG. 8A. Next, the configuration of the image sensor carrier 250 will be described in more detail with reference to FIGS. 8A and 8B.

First, as described above with reference to FIGS. 4 and 5, the image sensor carrier 250 may include a sensor carrier main body 251, a receiving portion 252, and one or more bent portions 253.

The sensor carrier main body 251 is formed with a receiving opening to receive the image sensor 260, and a supporting surface 251a that faces the outer peripheral surface of the second member 222 may be formed on the periphery of the receiving opening.

The receiving portion 252 may be formed with a recessed receiving space to receive the image sensor 260. For example, the receiving portion 252 may be recessed to the inside of the receiving opening of the sensor carrier main body 251, and the receiving space may be formed.

As illustrated in FIGS. 8A and 8B, the bent portions 253 are bent to form the receiving space, and may be formed between the sensor carrier main body 251 and the receiving portion 252. For example, the bent portions 253 may be bent and formed between the sensor carrier main body 251 and the receiving portion 252 so as to form the receiving space of the receiving portion 252. The receiving portion 252 may be formed with a sensor seat portion 252a so that the image sensor 260 can be seated thereon. For example, the image sensor 260 may be placed on the sensor seat portion 252a.

The receiving portion 252 can be received in and coupled to the first opening 211 of the board 210 through the second and third openings 221a and 222a of the first and second members 221 and 222. Therefore, by receiving the image sensor 260 in the board 210 using the image sensor carrier 250, the product can be manufactured to be small and thin.

Figure 3:
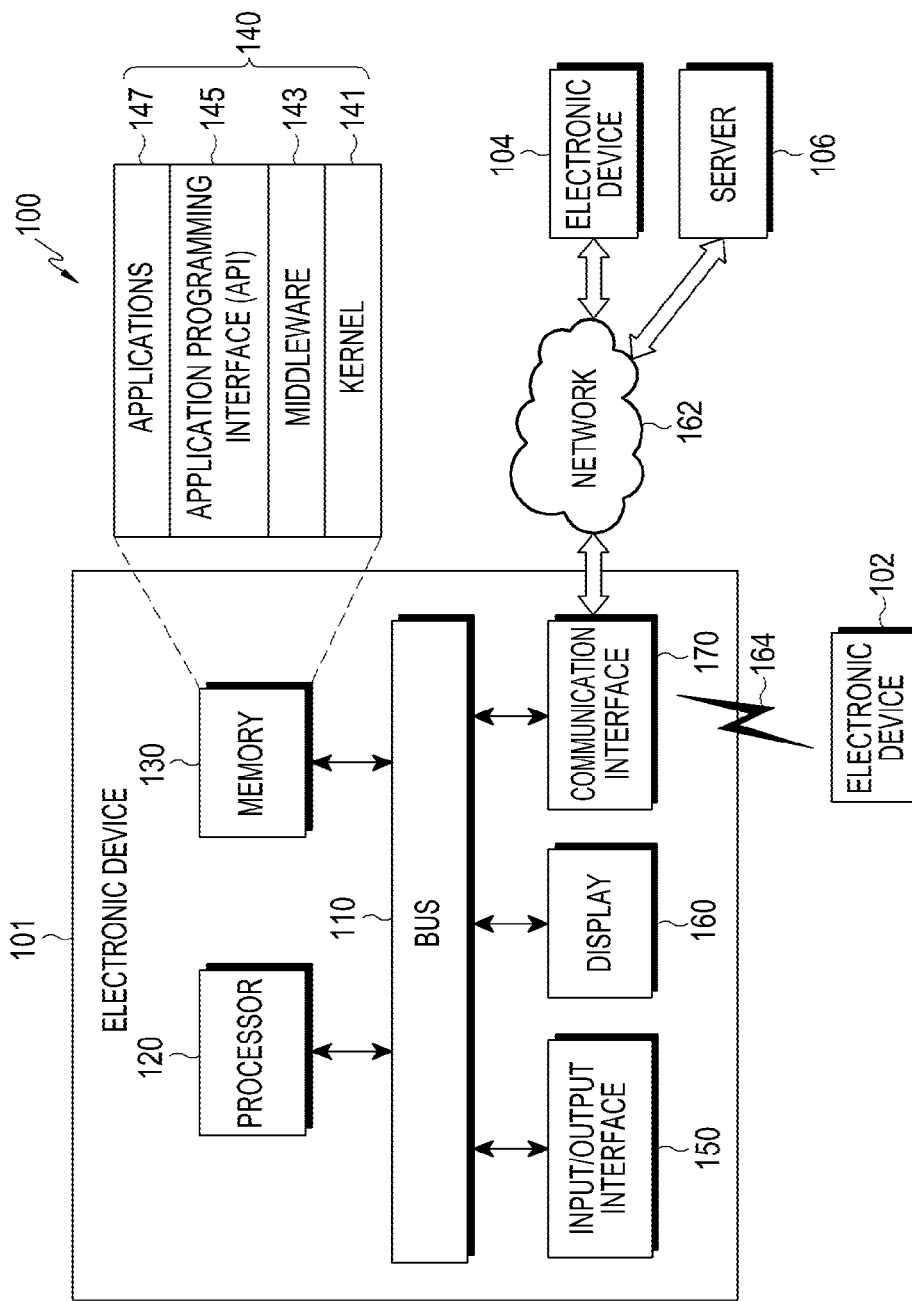
FIG. 3 is a view illustrating a network environment that includes an electronic device according to various embodiments of the present disclosure.

As yet another example, the electronic device 10 (illustrated in FIG. 3) may include a processor 120 (see FIG. 3). The processor 120 may be set to control the motion of the second member 222 of the OIS actuator 220 in the opposite direction to the first direction (X,Y-axis direction) of the movement of the electronic device 10 using the control members 223 of the OIS actuator 220 in response to the movement of the electronic device 10.

As yet another example, the processor 120 (see FIG. 3) may be set to control the auto-focusing of the lens unit 240 by moving the lens unit 240 in the second direction (Z-axis) using the AF actuator 230.

Hereinafter, the assembly of a sensor driving type camera module 200 according to various embodiments of the present disclosure will be described with reference to FIG. 4 described above.

The camera module 200 may include a base plate 280 on the rear face of the board 210, and magnets 291 may be seated on one or more magnet seat portions 212 formed on the board 210. One or more ball members 290 may be inserted into through holes 213 formed in the board 210, respectively. A first member 221 may be provided on the upper face of the board 210. At this time, the ball members 290 may pass through the through holes 221c formed in the first member 221. A second member 222 may be movably disposed on the upper surface of the first member 221, and the rear surface of the second member 222 may face the ball members 290. For example, the second opening 221a of the first member 221 may be placed to face the first opening 211 of the board 210, and the second member 222 may be movably disposed on the upper face of the first member 221. At this time, the third opening 222a of the second member 222 may be placed to face the first opening 211 of the board 210 and the second opening 221a of the first member 221. The first end of the one or more control members 223 may be fixedly coupled to the fixed portion 221b of the first member 221, and the second end of the one or more control members 223 may be coupled to a movable coupling portion 222b of the second member 222.

In this state, the image sensor carrier 250 including the image sensor 260 can be coupled to the first, second, and third openings 211, 221a, and 222a, which face each other. At this time, the receiving portion 252 formed in the image sensor carrier 250 may be coupled to form a penetration portion with the second and third openings 221a and 222a, and may then be received and seated in the first opening 211 of the board 210.

An infrared filter may be provided above the image sensor 260, and an AF actuator 230 including the lens unit 240 received therein may be provided on the image sensor carrier 250.

Hereinafter, the operation of the sensor driving type camera module 200 according to various embodiments of the present disclosure will be described with reference to FIG. 7 and FIGS. 8A and 8B.

As described above with reference to FIG. 7, the "Z-axis direction" indicates a second direction in which the lens unit 240 is moved in the vertical direction of the camera module 200, and the "X,Y-axis direction" indicates a first direction in which the lens unit 240 is moved in a length or width direction in the horizontal direction. An AF actuator described later may move the lens unit 240 along the second direction (Z-axis direction) to provide a driving force for adjusting the focus, and the OIS actuator may drive the image sensor carrier 250 including the image sensor 260 in the first direction (X,Y-axis direction) to provide a driving force for correcting a horizontal balance state.

First, the magnets 291 seated on the board 210 may position the AF actuator 230 including the lens unit 240 received therein at the center in the second direction (Z-axis direction) by a magnetic force. For example, it is possible to set an initial position in the state prior to the movement of the lens unit 240.

In this state, when the power of the board 210 is applied to the control members 223 through the first member 221, the control members 223 are heated and change the length thereof by contraction and relaxation so that the second member 222 can be moved in the first direction (X,Y-axis direction).

According to one embodiment, as illustrated in FIGS. 8A and 8B, the first end of the control members 223 is coupled to the fixed portion 221b of the first member 221, and the second end of the control members 223, which is opposite to the first end, is coupled to the movable coupling portion 222b of the second member 222. Thus, when the power is applied to the control members 223, the second member 222 can be moved in the first direction (X,Y-axis direction) to move the image sensor carrier 250 so that the image sensor carrier 250 can correct the camera shake. Because the one or more ball members 290 are provided between the second member 222 and the base plate 280 so as to make the second member 222 movable, the second member 222 can be moved through the rolling movement of the ball members 290. The second member 222 may provide a driving force to move the image sensor carrier 250 including the image sensor 260 in the first direction (X,Y-axis direction) as well as to correct the camera shake with the help of the control members 223.

For example, because the processor 120 (see FIG. 3) included in the electronic device 10 (see FIG. 3) is set to control the motion of the second member 222 of the OIS actuator 220 in the opposite direction to the first direction (X,Y-axis direction) of the movement of the electronic device 10 using the control members 223 of the OIS actuator 220 in response to the movement of the electronic device 10, the processor 120 (see FIG. FIG. 3) may control the movement of the second member 222 to provide the driving force such that the image sensor carrier 250 including the image sensor 260 can be moved in the first direction (X,Y-axis direction) to correct the camera shake.

Since the electronic device 10 is provided with an OIS actuator side position sensor unit (not illustrated) that recognizes and detects the driving position of the second member 222, the driving position of the second member 222 may be detected by the OIS actuator side position sensor unit (not illustrated).

The OIS actuator 220 may have a magnet, and the position sensor unit may be positioned in the first member, which is a fixed member.

In addition, when the second member 222 is driven by the control members 223, the second member 222 may be driven by the magnetic force of the magnets 291 to return the image sensor carrier 250 to the initial position thereof again. For example, the second member 222 may be returned back to be positioned at the center in the second direction (Z-axis direction) by the magnetic force of the magnets 291. At this time, the image sensor carrier 250 may be located at the center of the lens unit 240.

When the lens unit 240 is driven in the second direction (Z-axis direction), power can be supplied to a coil (not illustrated) included in the AF actuator 230 through the board 210. When the power is applied to the coil, the lens unit 240 can be driven in the second direction (Z-axis direction) by the electromagnetic force generated between the coil and an AF actuator side magnet (not illustrated). At this time, a focal distance between the lens unit 240 and the image sensor 260 can be adjusted automatically. The AF actuator side position sensor unit (not illustrated) provided at a neighboring position of the coil (not illustrated) can detect the moving position of the lens unit 240 in the second direction (Z-axis direction).

For example, by configuring the AF actuator side position sensor unit (not illustrated) to be capable of performing a feedback measurement of a gauss value of the coil (not illustrated) and the AF actuator side magnet (not illustrated) in order to drive the AF actuator 230 including the lens unit 240 received therein, the AF actuation of the camera module 200 can be precisely sensed by the AF actuator side position sensor unit.

According to one embodiment, the AF actuator 230 can drive the coil (not illustrated) and the AF actuator side magnet (not illustrated) in the second direction (Z-axis direction) with a Lorenz type electromagnetic force. The AF actuator side position sensor unit (not illustrated) may sense the driving of the AF actuator side magnet 291 in the second direction (Z-axis direction).

For example, since the processor 120 (see FIG. 3) provided in the electronic device 10 (see FIG. 3) is set to control the auto-focusing of the lens unit 240 by moving the lens unit 240 in the second direction (Z-axis direction), the processor may control the auto-focusing movement of the lens unit in the second direction (Z-axis direction) using the AF actuator 230.

In order to reduce the size and height of the product in the OIS actuator 220 as described above, the image sensor carrier 250 is configured to receive the image sensor 260 received in the board 210 so that it is possible to slim the product by reducing the height of the product, which has occurred by providing the image sensor 260 on the board 210 in the existing product.

As yet another example, by electrically connecting the first member 221 and the control member 223 electrically connected to each other without soldering the first member 221 to the control member 223, the power applied to the board 210 can be supplied to the control member 223 through the first member 221, and the second member 222 can be moved by making the length of the control members 223 variable by the contraction and relaxation of the control members 223. Therefore, the manufacturing cost of the product can be reduced by reducing the number of soldering steps.

The operation of the sensor driving type camera module 200 provided in the electronic device according to various embodiments of the present disclosure will be described in detail as follows.

Figure 9:
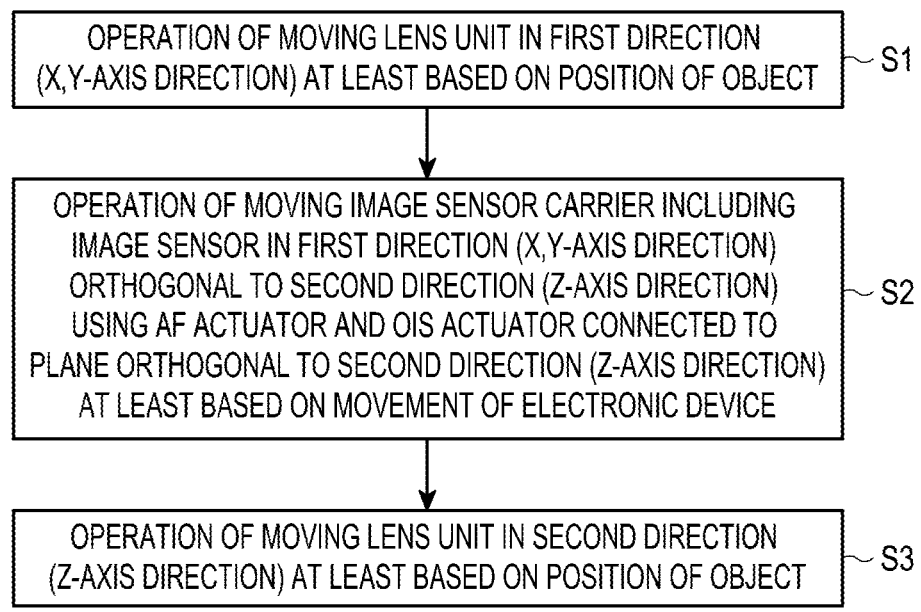
FIG. 9 is a flowchart illustrating an operating state of the camera module according to various embodiments of the present disclosure.

FIG. 9 is a flowchart illustrating an operating state of the camera module 200 according to various embodiments of the present disclosure.

Referring to FIG. 9, an operation of the sensor driving type camera module 200 will be described. In an electronic device including a lens unit 240, an AF actuator 230 connected to the lens unit 240 in the second direction (Z-axis direction), and an OIS actuator 220 connected to the AF actuator 230 in the first direction (X,Y-axis direction), the camera module 200 may operate such that the lens unit 240 can be moved in the second direction (Z-axis direction) based on at least a position between an external object and the electronic device and using the AF actuator 230 (S1), and at least based on the movement of the electronic device, the camera module 200 may operate such that the image sensor carrier 250 including the image sensor 260 can be moved in the first direction (X,Y-axis direction) orthogonal to the second direction (Z-axis direction) using the AF actuator 230 and the OIS actuator 220 connected to a plane orthogonal to the second direction Z-axis direction) (S2).

At least based on the position of the external object, the camera module 200 may operate such that the lens unit 240 can be moved in the second direction (Z axis-direction) (S3).

Then, the camera module 200 can acquire at least one image for the external object using the lens unit 240.

In addition, the electronic device 10 (see FIG. 3) may include a processor 120 (illustrated in FIG. 3), and the processor 120 may operate based on the movement of the electronic device 10 such that the image sensor carrier 250 including the lens unit 240 and the image sensor 260 can be moved in the first and second directions using the AF actuator 230 and the OIS actuator 220. For example, the processor may be set to control the movement of the second member 222 of the OIS actuator 220 in order to move the image sensor carrier 250 including the image sensor 260 in the first direction, and the processor may be set to control the auto-focusing of the lens unit 240 in the second direction using the AF actuator 230.

A method of recognizing a position between an external object and an electronic device may be implemented by any one of a contrast based recognition, a phase difference based recognition, and a depth sensor based recognition. A recognition method other than the above-mentioned recognition methods may be applied to the method of recognizing the position between the external object and the electronic device.

According to various embodiments of the present disclosure, the electronic device may include: a board; a first member fixed to the board; a second member movably connected to the first member, and formed in at least a portion of the first member; and a control member connected to the first member and the second member so as to control the second member in response to a movement of the electronic device.

According to various embodiments of the present disclosure, the electronic device may further include an opening formed in at least a portion of the board, and the second member may extend from a first region connected to the first member to the opening to a second region formed on the board.

According to various embodiments of the present disclosure, the electronic device may further include an image sensor, and the image sensor may be disposed in at least a portion of the second region.

According to various embodiments of the present disclosure, the electronic device may further include a lens, which may be formed on the portion in which the image sensor is disposed.

According to various embodiments of the present disclosure, the electronic device may further include a processor, which may be set to control a change in at least one of shape, length, or volume of the control member in response to the movement of the electronic device.

According to various embodiments of the present disclosure, the processor may be set to control a movement of the second member in a direction opposite to a direction of the movement of the electronic device using the control member in response to the movement of the electronic device.

According to various embodiments of the present disclosure, a base plate may be included on a rear face of the board.

According to various embodiments of the present disclosure, a ball member may be provided between the second member and the base plate to support a movement.

According to various embodiments of the present disclosure, the control member may include a Shape Memory Alloy (SMA) wire to control a movement of the second member by contraction and relaxation.

According to various embodiments of the present disclosure, at least a portion of the first member may be formed such that at least a portion of the second member is superimposed on the first member.

According to various embodiments of the present disclosure, there is provided an electronic device including a camera module. The electronic device may further include: a lens unit; a board including a first opening; an image sensor carrier including an image sensor that moves in a first direction (X,Y-axis direction); an optical image stabilization actuator that receives the image sensor carrier and moves the image sensor carrier in the first direction (X,Y axis-direction); and at least one auto-focusing actuator provided on the image sensor to move the lens unit in a second direction (Z-axis direction). The image sensor carrier may be arranged such that the image sensor may be received in the first opening through the optical image stabilization actuator.

According to various embodiments of the present disclosure, the optical image stabilization actuator may include: a first member fixed to the board and including a second opening; a second member movably connected to the first member and including a third opening, the second member being provided to be superimposed on the first member; and at least one control member connected to the first member and the second member, the control member controlling the second member in response to a movement of the electronic device.

According to various embodiments of the present disclosure, the electronic device may include a base plate on a rear face of the board to support the board.

According to various embodiments of the present disclosure, the electronic device may further include at least one magnet provided on the board so as to seat the auto-focusing actuator having the lens unit received therein on the image sensor carrier by a magnetic force, and to cause the image sensor carriers to be returned to a center position of the lens unit after the image sensor carrier is moved. The board may further include at least one magnet seat portion coupled with the at least one magnet.

According to various embodiments of the present disclosure, the electronic device may further include at least one ball member included between the second member and the base plate to penetrate through-holes formed in the board and the first member and to face the rear face of the second member so as to support a movement of the second member.

According to various embodiments of the present disclosure, the image sensor carrier may include: a sensor carrier main body; a support face formed around an outer periphery of the sensor carrier main body to face an upper outer peripheral face of the second member; a receiving portion including a recessed receiving space to receive the image sensor in the sensor carrier main body; and at least one bent portion formed between the sensor carrier main body and the receiving portion and bent to form the receiving space.

According to various embodiments of the present disclosure, the receiving portion may further include a sensor seat portion that seats the image sensor thereon.

According to various embodiments of the present disclosure, the electronic device may further include a processor that is set to control a movement of the second member of the optical image stabilization actuator in a direction opposite to the first direction (X,Y-axis direction) of the movement of the electronic device using the control member of the optical image stabilization actuator in response to the movement of the electronic device. The processor may be set to control the auto-focusing of the lens unit in the second direction (Z-axis direction) using the auto-focusing actuator.

In the following, descriptions will be made in detail with reference to a configuration of the lens driving type camera module 300 provided in the electronic device 10 (see FIG. 3) according to other various embodiments of the present disclosure.

Figure 10:
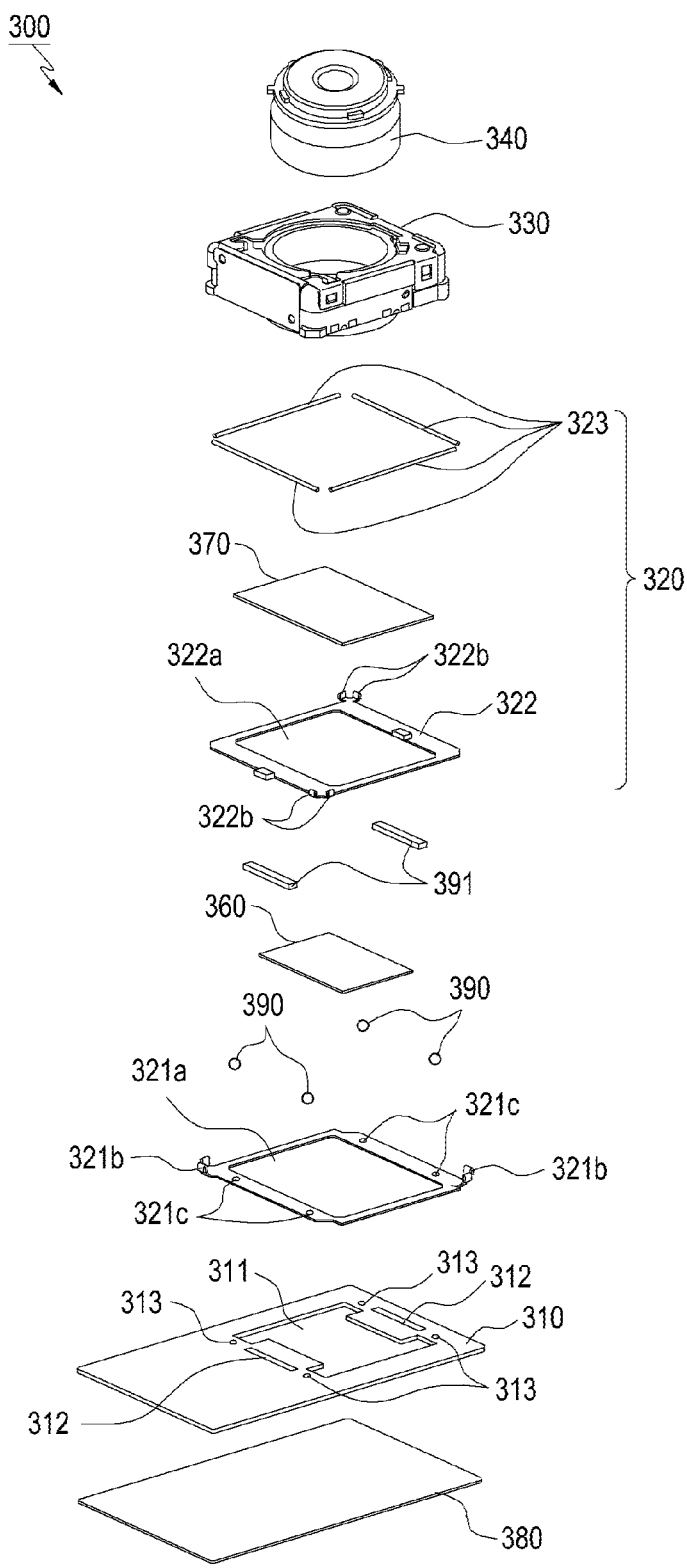
FIG. 10 is an exploded perspective view illustrating a configuration of a camera module according to other various embodiments of the present disclosure.
Figure 11:
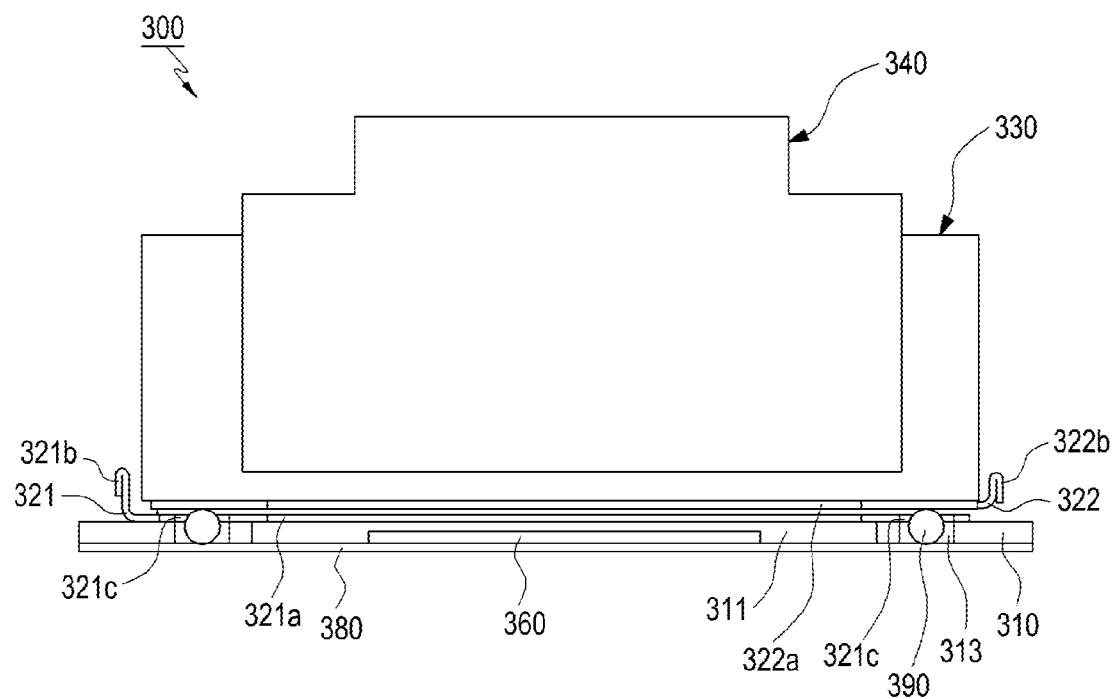
FIG. 11 is a side sectional view illustrating an assembled state of the camera module according to other various embodiments of the present disclosure.

FIG. 10 is an exploded perspective view illustrating a configuration of the lens driving type camera module 300 according to other various embodiments of the present disclosure. FIG. 11 is a side sectional view illustrating the coupling state of a camera module 300 according to various embodiments of the present disclosure.

Referring to FIGS. 10 and 11, the sensor driving type camera module 300 may include, for example, a board 310 including a first opening 311, an OIS actuator 320 including second and third openings 321*a* and 322*a*, an image sensor 360, and an AF actuator 330 including a lens unit 340 received therein. The lens unit 340 may be driven in a second direction (e.g., Z-axis direction) or a first direction (e.g., X,Y-axis direction) by the OIS actuator 320 or the AF actuator 330. The OIS actuator 320 may be provided on the board 310 to drive the image sensor carrier 340 in the first direction (e.g., X,Y-axis direction) so as to correct an error caused by the user's camera shake. The AF actuator 330 may be provided on the OIS actuator 320 to drive the lens unit 340 in the second direction (e.g., Z-axis direction).

As described above, the image sensor 360 is received in the first opening 311 of the board 310 and the second and third openings 321*a* and 322*a* of the OIS actuator 320, so that the image sensor 360 can be received in the board 210 without a separate part. Thus, it is possible not only to reduce the material cost of the produce, but also to reduce the thickness of the product to make the product smaller or slimmer.

An IR filter 370 may be provided on the upper surface of the image sensor 360 so as to block a portion of the light entering the camera module 300, which has a wavelength shorter than that of the red color in visible light ray.

According to one embodiment, the configuration of the OIS actuator 320 will be described in more detail.

As described above with reference to FIG. 10, the OIS actuator 320 may include, for example, first and second members 321 and 322 and one or more control members 323.

The first member 321 may include the second opening 321a, and may be fixed to the upper surface of the board 310 so as to support the movement of the second member 322 to be described later.

The second member 322 may movably face the upper surface of the first member 321. The second member 222 may include the third opening 322a, and may be superimposed on the first member 321.

The control members 323 may be connected to the first member 321 and the second member 322 to be contracted and relaxed in order to control the second member 322 in response to the movement of the electronic device.

For example, as illustrated in FIG. 11, the first member 321 may be fixed around the outer periphery of the first opening 311 of the board 310. The first member 321 may have a second opening 321a formed to correspond to the first opening 311. Accordingly, when the first member 321 is fixed to the upper surface of the board 310, the second opening 321a of the first member 321 may face the first opening 311 of the board 310 to form a penetration portion.

The second member 322 is movably disposed on the outer periphery of the first member 321 and a third opening 322a is formed in the second member 322. Thus, when the second member 322 is disposed to be superimposed on the first member 321, the second opening 321a of the first member 321 and the third opening 322a of the second member 322 may face each other to form a penetration portion.

For example, when the first member 321 is fixed to the upper surface of the board 310 and the second member 322 is movably disposed on the upper surface of the first member 321, the first opening 311 of the board 310 and second and third openings 321a and 322a of the first and second members 321 and 322 may face each other to form a penetration portion.

In this state, the image sensor 360 can be coupled through the first, second, and third openings 311, 321a, and 322a.

As another example, a base plate 380 may be provided on the rear face of the board 310 to support the board 310. The base plate 380 may be made of a metallic material.

The upper face of the base plate 380 may be configured to seat the image sensor 360 coupled through the first opening 311 of the board 310 thereon.

According to one embodiment, the one or more control members 323 may be made of a Shape Memory Alloy (SMA) wire, and the material of the one or more control members 323 may be a Shape Memory Alloy (SMA). In the present embodiment, the one or more control members 323 are described with reference to an SMA by way of example, but are not limited thereto. That is, the one or more control members 323 may be variously applicable as long as the control members 323 are made of a material, the length of which can be changed by contraction and relaxation according to the application of power.

For example, the first end of the one or more control members 323 may be fixedly coupled to the fixed portion 321b of the first member 321, and the second end of the one or more control members 323 may be coupled to a movable coupling portion 322b of the second member 322. Accordingly, the first end of the control member 323 may be fixed to the first member 321 fixed to the board 310, and the second end of the control member 323 may be coupled to the movable second member 322 so as to make the second member 322 movable.

In this way, the first member 321 may be disposed on the board 310 and is electrically connected to the board 310. The first member 321 may transmit power supplied via the board 310 to the control members 323 to simultaneously heat the control members 323 so that the control members 323 can be contracted and relaxed to change the length thereof, thereby moving the second member 322.

Accordingly, since the first member 321 does not require separate external soldering to the board 310 and the control members 323, it is possible to reduce the number of soldering steps, thereby reducing the manufacturing cost of the product.

As still another example, as illustrated in FIG. 10, the board 310 may be provided with one or more magnets 391 in order to seat the AF actuator 330, which receives the lens unit 340, on the image sensor by a magnetic force, and to return the lens unit 340 to the center position of the image sensor after the sensor unit 340 is moved. The magnets may be seated on one or more magnet seat portions 312 to be capable of being seated on the board 310. For example, one or more magnet seat portions 312 may be formed on the board 310, and the magnets 291 may be seated on the magnet seat portions 312. The magnet 391 may cause the lens unit to return to the initial position thereof by the magnetic force after a movement by the OIS actuator. For example, the magnets can position the lens unit in the center of the image sensor, which is the initial position. As still another example, the function of the magnets may be replaced by an elastic member (e.g., a wire spring or a leaf spring). The elastic member can move the lens unit to the initial position using the elastic force instead of the magnetic force of the magnets.

According to one embodiment, between the second member 322 and the base plate 380, the through hole 313 formed in the board 310 and the through hole 321c formed in the first member 321 may form a penetration portion, and one or more ball members 390 may be included to support the movement of the second member 322 while facing the rear face of the second member 322. For example, the ball members 390 may be provided to reduce frictional force between the second member 322 and the base plate 380 when the second member 322 is moved. For example, the one or more ball members 390 may be used as a method of smoothly moving or rolling the second member 322, or reducing the frictional force.

According to one embodiment, the OIS actuator 320 may be provided with at least one position sensor unit (not shown) in order to detect the moved position of the second member 322. The position sensor unit may be formed as an OIS side position sensor unit.

For example, the processor 120 (see FIG. 3) may be set to control the motion of the second member 322 of the OIS actuator 320 in the opposite direction to the first direction (X,Y-axis direction) of the movement of the electronic device 10 (see FIG. 3) using the control members 323 of the OIS actuator 320 in response to the movement of the electronic device 10.

As yet another example, the processor 120 (see FIG. 3) may be set to control the movement of the lens unit in the second direction (Z-axis) using the AF actuator 330.

Hereinafter, the assembly of a lens driving type camera module 300 according to various embodiments of the present disclosure will be described with reference to FIGS. 10 and 11 described above.

The lens driving type camera module 300 may include a base plate 380 on the rear face of the board 310, and magnets 391 may be seated on one or more magnet seat portions 312 formed on the board 310. One or more ball members 390 may be inserted into through holes 313 formed in the board 310, respectively. A first member 321 may be provided on the upper face of the board 310. At this time, the ball members 390 may pass through the through holes 321c formed in the first member 321. A second member 322 may be movably disposed on the upper surface of the first member 321, and the rear surface of the second member 322 may face the ball members 390. For example, the second opening 321a of the first member 321 may be placed to face the first opening 311 of the board 310, and the second member 322 may be movably disposed on the upper face of the first member 321. At this time, the third opening 322a of the second member 322 may be placed to face the first opening 311 of the board 310 and the second opening 321a of the first member 321. The first end of the one or more control members 323 may be fixedly coupled to the fixed portion 321b of the first member 321, and the second end of the one or more control members 323 may be coupled to a movable coupling portion 322b of the second member 322.

In this state, the image sensor 360 can be coupled through the first, second, and third openings 311, 321a, and 322a, which face each other. At this time, the image sensor 360 may be coupled through the first opening 311 of the board 310, and may be seated on the upper face of the base plate 380.

An infrared filter 370 may be provided above the image sensor 360, and an AF actuator 330 including the lens unit 340 received therein may be provided on the image sensor 360.

First, as described above with reference to FIG. 11, the magnets 391 seated on the board 310 may position the AF actuator 330 including the lens unit 340 received therein at the central portion in the second direction (Z-axis direction) by a magnetic force. For example, it is possible to set an initial position in the state prior to the movement of the lens unit 340.

In this state, when the power of the board 310 is applied to the control members 323 through the first member 321, the control members 323 can change the length thereof by contraction and relaxation so that the second member 322 can be moved in the first direction (X,Y-axis direction).

According to one embodiment, the first end of the control members 323 is coupled to the fixed portion 321a of the first member 321, and the second end of the control members 323, which is opposite to the first end, is coupled to the movable coupling portion 322a of the second member 322. Thus, when the power is applied to the control members 323, the second member 322 can be moved in the first direction (X,Y-axis direction) to correct the shaking of the lens unit 340. Because the one or more ball members 390 are provided between the second member 322 and the base plate 380 so as to make the second member 322 movable, the second member 322 can be moved by the ball members 390. The second member 322 may provide a driving force to move the lens unit 340 in the first direction (X,Y-axis direction) as well as to correct the user's camera shake with the help of the control members 323.

For example, because the processor 120 (see FIG. 3) included in the electronic device 10 (see FIG. 3) is set to control the motion of the second member 322 of the OIS actuator 320 in the opposite direction to the first direction (X,Y-axis direction) of the movement of the electronic device 10 using the control members 323 of the OIS actuator 320 in response to the movement of the electronic device 10, the processor 120 (see FIG. FIG. 3) may control the movement of the second member 322 to provide the driving force such that the lens unit 340 can be moved in the first direction (X,Y-axis direction) to correct the user's camera shake.

Since the electronic device 10 is provided with an OIS actuator side position sensor unit (not illustrated) that recognizes and detects the driving position of the second member 322, the driving position of the second member 322 may be detected by the OIS actuator side position sensor unit (not illustrated). In addition, when the second member 322 is driven by the control members 323, the second member 322 may be driven by the magnetic force of the magnets 391 to return the lens unit 340 to the initial position thereof again. For example, the second member 322 may be positioned at the center in the second direction (Z-axis direction) by the magnetic force of the magnets 391.

As still another example, when the lens unit 340 is driven in the second direction (Z-axis direction), power can be supplied to a coil (not illustrated) included in the AF actuator through the board 310. When the power is applied to the coil, the lens unit 340 can be driven in the second direction (Z-axis direction) by the electromagnetic force generated between the coil and an AF actuator side magnet 391. At this time, a focal distance between the lens unit 340 and the image sensor 360 can be adjusted automatically. The AF actuator side position sensor unit provided at a neighboring position of the coil can detect the moving position of the lens unit 340 in the second direction (Z-axis direction).

For example, by configuring the AF side position sensor unit (not illustrated) to be capable of performing a feedback measurement of a gauss value of the coil (not illustrated) and the AF actuator side magnet (not illustrated) in order to drive the AF actuator 330 including the lens unit 340 received therein, the AF actuation of the camera module 300 can be precisely sensed by the AF actuator side position sensor unit.

According to one embodiment, the AF actuator 330 can drive the coil (not illustrated) and the AF actuator side magnet 391 in the second direction (Z-axis direction) with a Lorenz type electromagnetic force. The AF actuator side position sensor unit may sense the driving of the AF actuator side magnet 391 in the second direction (Z-axis direction).

For example, since the processor 120 (see FIG. 3) provided in the electronic device 10 (see FIG. 3) is set to control the auto-focusing of the lens unit by moving the lens unit in the second direction (Z-axis direction) using the OIS actuator 330, the processor 120 (see FIG. 3) may control the auto-focusing movement of the lens unit in the second direction (Z-axis direction) using the AF actuator 330.

In order to reduce the size and height of the product in the OIS actuator 320 as described above, the image sensor 360 is configured to be received inside the board 310 so that it is possible to slim the product by reducing the height of the product, which has occurred by providing the image sensor 360 on the board 310 in the existing product.

As yet another example, by electrically connecting the first member 321 and the control member 323 electrically connected to each other without soldering the first member 321 to the control member 323, the power applied to the board 310 can be supplied to the control member 323 through the first member 321, and the second member 322 can be moved by making the length of the control members 323 variable by the contraction and relaxation of the control members 323. Therefore, the manufacturing cost of the product can be reduced by reducing the number of soldering steps.

The operation of the camera module included in the electronic device according to other various embodiments of the present disclosure is the same as that of the various embodiments of the present disclosure described above with reference to FIG. 11, and thus the description thereof will be omitted.

According to various embodiments of the present disclosure, in an electronic device that includes a camera module, the electronic device may include: a lens unit; a board including a first opening; an optical image stabilization actuator provided in the first opening, and including a third opening to move the lens unit in a first direction (X,Y-axis direction); an image sensor received in the first opening and coupled through the third opening; and at least one auto-focusing actuator provided on the image sensor to move the lens unit in a second direction (Z-axis direction).

According to various embodiments of the present disclosure, the optical image stabilization actuator may include: a first member fixed to the board and including a second opening formed therein; a second member movably connected to the first member and including the third opening, the second member being provided to be superimposed on the first member; and a control member connected to the first member and the second member so as to control the second member in response to a movement of the electronic device.

According to various embodiments of the present disclosure, the electronic device may further include a base plate on the rear face of the board to support the board and to seat the image sensor thereon.

According to various embodiments of the present disclosure, the image sensor may be coupled to penetrate the first to third openings and may be provided on an upper face of the base plate.

Figure 12:
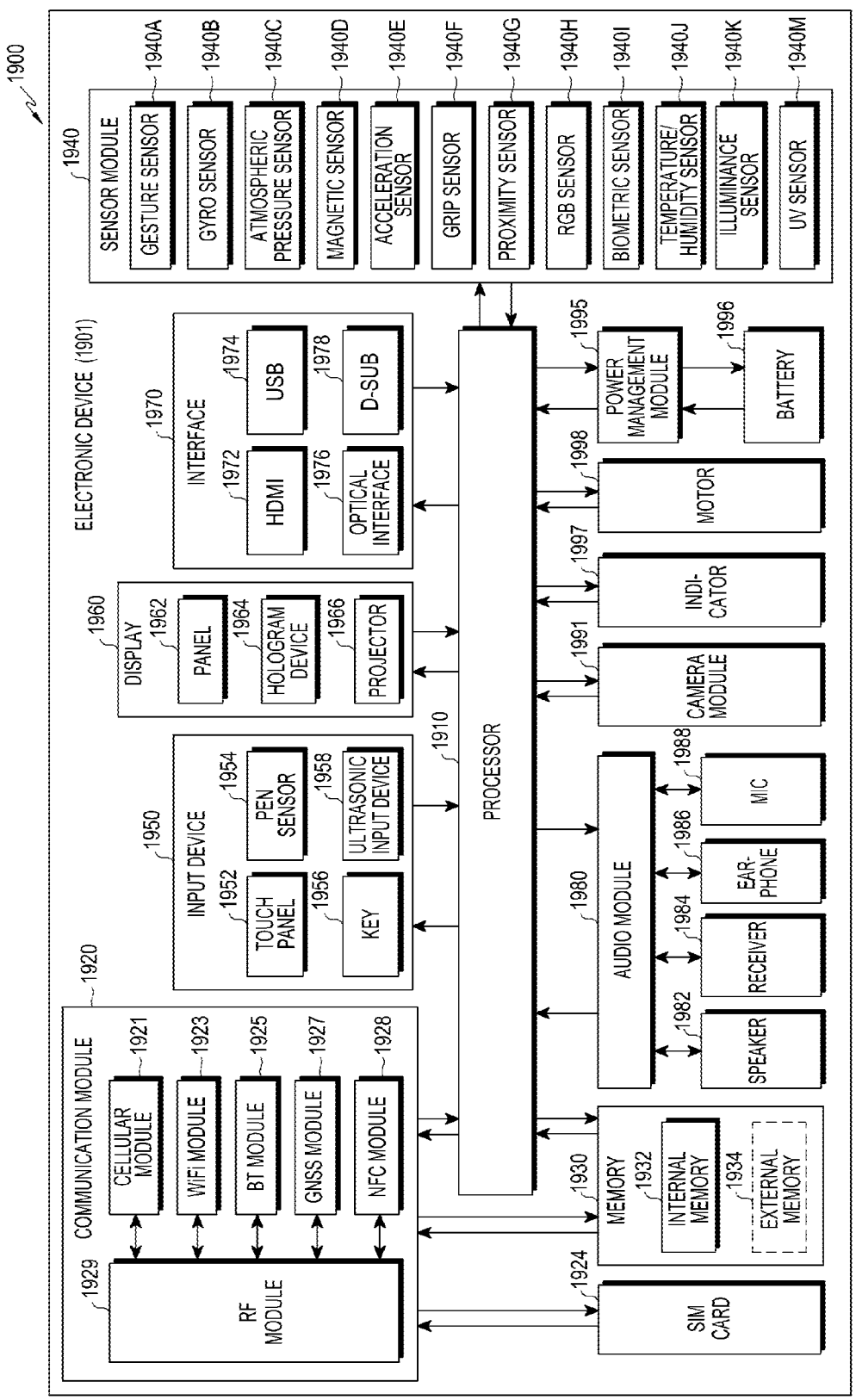
FIG. 12 is a block diagram illustrating a detailed configuration of an electronic device according to various embodiments of the present disclosure.

FIG. 12 is a block diagram of an electronic device 1901 according to various embodiments. The electronic device 1901 may include, for example, the whole or a portion of the electronic device 10 illustrated in FIG. 1. The electronic device 1901 may include at least one processor (e.g., an Application Processor (AP)) 1910, a communication module 1920, a subscriber identification module 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive, for example, an operating system or an application program so as to control a plurality of hardware or software components connected thereto, and may also perform various data processing and arithmetic operations. The processor 1910 may be implemented by, for example, a System-on-Chip (SoC). According to one embodiment, the processor 1910 may further include a Graphic Processing Unit (GPU) and/or an image signal processor. The processor 1910 may include at least some components (e.g., a cellular module 1921) among the components illustrated in FIG. 19. The processor 1910 may load a command or data received from at least one of the other components (e.g., a non-volatile memory) in a volatile memory to process the command and data, and may store various data in a non-volatile memory.

The communication module 1920 may have a configuration that is the same as or similar to the communication interface 170 of FIG. 3. The communication module 1920 may include, for example, a cellular module 1921, a WiFi module 1923, a Bluetooth module 1925, a GNSS module 1927 (e.g., GPS module, Glonass module, Beidou module, or Galileo module), an NFC module 1928, and a Radio Frequency (RF) module 1929.

The cellular module 1921 may provide, for example, a voice call, a video call, a message service, or an internet service through a communication network. According to one embodiment, the cellular module 1921 may perform discrimination and authentication of the electronic device 1901 within the communication network by using the subscriber identification module (e.g., a SIM card) 1924. According to one embodiment, the cellular module 1921 may perform at least some of the multimedia control functions that may be provided by the processor 1910. According to one embodiment, the cellular module 1921 may include a Communication Processor (CP).

Each of the WiFi module 1923, the Bluetooth module 1925, the GNSS module 1927, and the NFC module 1928 may include, for example, a processor to process data transmitted/received through a corresponding module. According to a certain embodiment, at least some (e.g., two or more) of the cellular module 1921, the WiFi module 1923, the Bluetooth module 1925, the GNSS module 1927, and the NFC module 1928 may be incorporated in a single Integrated Chip (IC) or an IC package.

The RF module 1929 may transmit/receive a communication signal (e.g., an RF signal). The RF module 1929 may include, for example, a transceiver, a Power Amp Module (PAM), a frequency filter, a Low Noise Amplifier (LNA), or an antenna. According to another embodiment, at least one of the cellular modules 1921, the WiFi module 1923, the Bluetooth module 1925, the GNSS module 1927, and the NFC module 1928 may transmit/receive an RF signal through one or more separate RF modules.

The subscriber identification module 1924 may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 1930 (e.g., the memory 130) may include, for example, an internal memory 1932 or an external memory 1934. The internal memory 1932 may include at least one of, for example, a volatile memory (e.g., Dynamic RAM (DRAM), Static RAM (SRAM), or Synchronous DRAM (SDRAM)), a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 1934 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1934 may be functionally and/or physically connected to the electronic device 1901 through various interfaces.

For example, the sensor module 1940 may measure a physical quantity or may sense an operating status of the electronic device 1901, and may then convert the measured or sensed information into electric signals. The sensor module 1940 may include at least one of, for example, a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H (e.g., RGB (Red, Green, Blue) sensor), a biometric sensor 1940I, a temperature/humidity sensor 1940J, an illuminance sensor 1940K, and an Ultra-Violet (UV) sensor 1940M. Additionally or alternatively, the sensor module 1940 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 1940 may further include a control circuit for controlling one or more sensors incorporated therein. In a certain embodiment, the electronic device 1901 may further include a processor configured to control the sensor module 1940 as a part of the processor 1910 or separate from the processor 1910 so as to control the sensor module 1940 while the processor 1910 is in the sleep state.

The input device 1950 may include a touch panel 1952, a (digital) pen sensor 1954, a key 1956, or an ultrasonic input device 1958. As the touch panel 1952, at least one of, for example, a capacitive type touch panel, a resistive type touch panel, an infrared type touch panel, and an ultrasonic type panel may be used. Also, the touch panel 1952 may further include a control circuit. The touch panel 1952 may further include a tactile layer so as to provide a tactile reaction to the user.

The (digital) pen sensor 1954 may be, for example, a portion of the touch panel or may include a separate recognition sheet. The key 1956 may include, for example, a physical button, an optical key, or a keypad. The ultrasonic input device 1958 may sense, through a microphone (e.g., a microphone 1988), ultrasonic waves generated by an input tool so as to confirm data corresponding to the sensed ultrasonic waves.

The display 1960 (e.g., the display 160) may include a panel 1962, a hologram device 1964, or a projector 1966. The panel 1962 may include a configuration that is the same as or similar to that of the display 160 of FIG. 1. The panel 1962 may be implemented to be, for example, flexible, transparent, or wearable. The panel 1962 may be configured as a single module with the touch panel 1952. According to one embodiment, the panel 1962 may include a pressure sensor (or a force sensor) that is capable of measuring the intensity of a pressure for a user's touch. The pressure sensor may be integrally implemented with the touch panel 1952, or implemented by one or more sensors separately from the touch panel 1952. The hologram device 1964 may show a stereoscopic image in the air using interference of light. The projector 1966 may project light onto a screen so as to display an image. The screen may be located, for example, inside or outside the electronic device 1901. According to one embodiment, the display 1960 may further include a control circuit to control the panel 1962, the hologram device 1964, or the projector 1966.

The interface 1970 may include, for example, a High-Definition Multimedia Interface (HDMI) 1972, a Universal Serial Bus (USB) 1974, an optical interface 1976, or a D-subminiature (D-sub) 1978. For example, the interface 1970 may be included in the communication interface 170 illustrated in FIG. 3. Additionally or alternatively, the interface 1970 may include, for example, a Mobile High-definition Link (MHL) interface, a Secure Digital (SD) card/ Multi-Media Card (MMC) interface, or an Infrared Data Association (IrDA) standard interface.

The audio module 1980 may bi-directionally convert, for example, sound and electric signals. At least some of the components of the audio module 1980 may be included in, for example, the input/output interface 150 illustrated in FIG. 3. The audio module 1980 may process sound information input or output through, for example, a speaker 1982, a receiver 1984, an earphone 1986, or a microphone 1988.

The camera module 1991 is a device that is capable of photographing, for example, a still image and a video image, and according to one embodiment, the camera module 1991 may include at least one image sensor (e.g., a front sensor or a rear sensor), a lens, an Image Signal Processor (ISP), or a flash (e.g., LED or xenon lamp).

The power management module 1995 may manage, for example, the electric power of the electronic device 1901. According to one embodiment, the power management module 1995 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 1996, and may also measure a voltage, a current, or a temperature during the charge. The battery 1996 may include, for example, a rechargeable battery and/or a solar battery.

The indicator 1997 may indicate a specific status (e.g., a booting status, a message status, or a charged status) of the electronic device 1901 or of a part thereof (e.g., AP 1910). The motor 1998 may convert an electric signal into a mechanical vibration, and may generate, for example, a vibration or a haptic effect. Although not illustrated, the electronic device 1901 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 13:
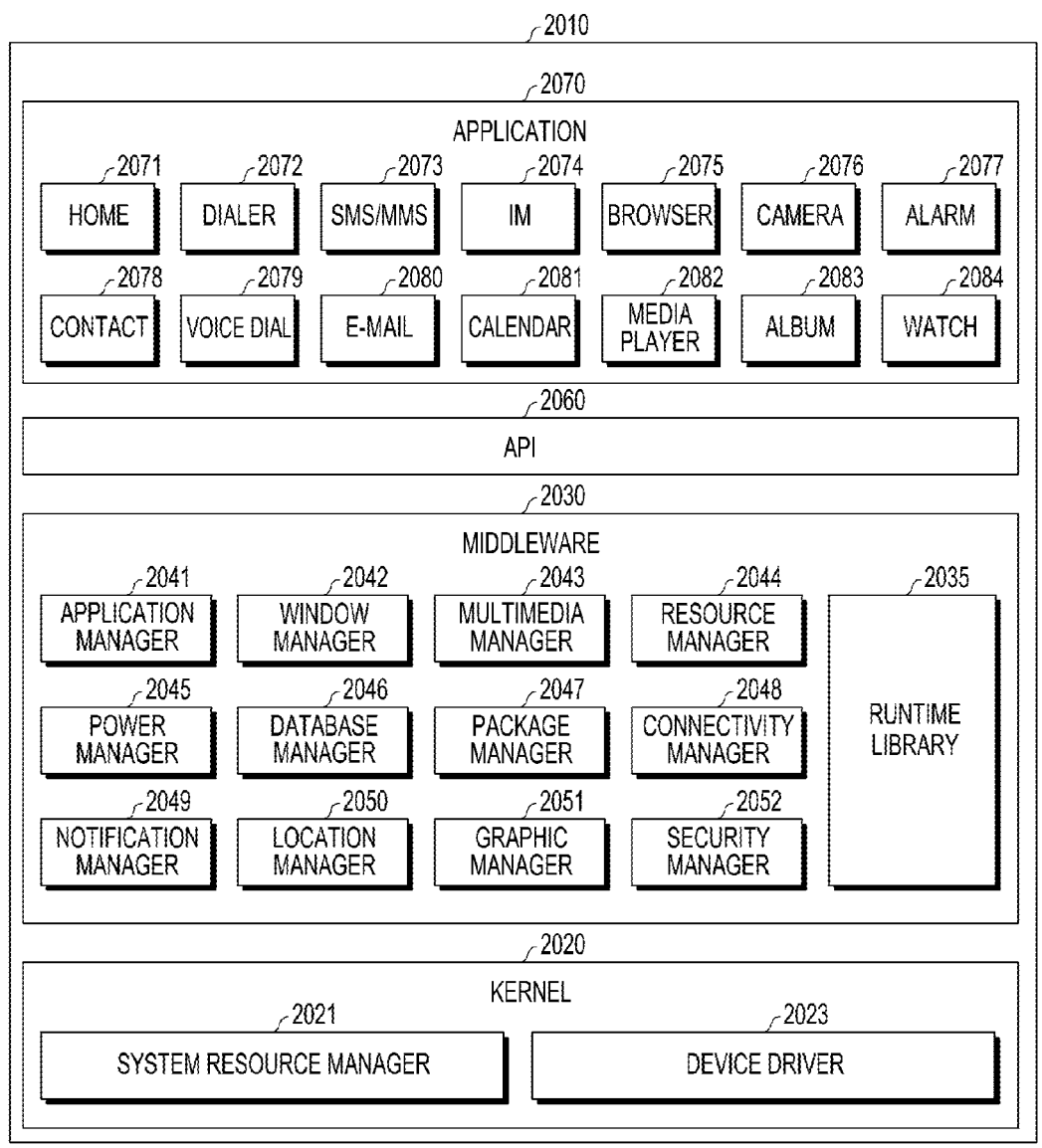
FIG. 13 is a block diagram illustrating a program module according to various embodiments of the present disclosure.

FIG. 13 is a block diagram illustrating a program module according to various embodiments. According to one embodiment, a program module 2010 (e.g., the program 140) may include an Operating System (OS) that controls resources associated with an electronic device (e.g., the electronic device 10) and/or various applications (e.g., the application program 147) that are driven on the operating system. The operating system may be, for example, Android, iOS, Windows, Symbian, Tizen, or Bada.

The program module 2010 may include a kernel 2020, a middleware 2030, an Application Programming Interface (API) 2060, and/or an application 2070. At least a part of the program module 2010 may be preloaded on the electronic device, or may be downloaded from an external electronic device (e.g., the device 102 or 104, or the server 106).

The kernel 2020 (e.g., the kernel 141) may include, for example, a system resource manager 2021 and/or a device driver 2023. The system resource manager 2021 may perform, for example, a control, allocation, or recovery of a system resource. According to one embodiment, the system resource manager 2021 may include, for example, a process management unit, a memory management unit, or a file system management unit. The device driver 2023 may include, for example, a display driver, a camera driver, a Bluetooth driver, a common memory driver, a USB driver, a keypad driver, a WiFi driver, an audio driver, or an Inter-Process Communication (IPC) driver.

The middleware 2030 may provide, for example, a function that is commonly required by the applications 2070, or may provide various functions to the applications 2070 through the API 2060 such that the applications 2070 can efficiently use the limited system resources within the electronic device. According to one embodiment, the middleware 2030 (e.g., the middleware 143) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, and a security manager 2052.

The runtime library 2035 may include, for example, a library module that is used by a compiler in order to add a new function through a program language while the applications 2070 are executed. The runtime library 2035 may perform, for example, input/output management, memory management, or a function for an arithmetic function.

The application manager 2041 may manage, for example, a life cycle of at least one application among the applications 2070. The window manager 2042 may manage a GUI resource that is used in a screen. The multimedia manager 2043 may grasp a format required for reproducing various media files, and may perform encoding or decoding of the media files by using a codec that is suitable for the corresponding format. The resource manager 2044 may manage a resource, such as a source code, a memory, or a storage space, of at least one application among the applications 2070.

The power manager 2045 is operated together with, for example, a Basic Input/Output System (BIOS) so as to manage a battery or a power source, and may provide, for example, power information that is required for operating the electronic device. The database manager 2046 may generate, retrieve, or change a database to be used by at least one application among the applications 2070. The package manager 2047 may manage the installation or update of an application that is distributed in the form of a package file.

The connectivity manager 2048 may manage, for example, a wireless connection of WiFi, Bluetooth, or the like. The notification manager 2049 may display or notify events, such as an arrival message, appointment, and proximity notification in a manner that does not disturb the user. The location manager 2050 may manage position information of the electronic device. The graphic manager 2051 may manage a graphic effect to be provided to the user or a user interface associated therewith. The security manager 2052 may provide all security functions required for, for example, system security, or user authentication. According to one embodiment, in the case where the electronic device (e.g., the electronic device 10) includes a phone function, the middleware 2030 may include a telephony manager to manage a voice or video call function of the electronic device.

The middleware 2030 may include a middleware module that forms a combination of various functions of the above-described components. The middleware 2030 may provide a module that is specialized for each kind of operation system in order to provide differentiated functions. In addition, the middleware 2030 may dynamically delete some of the existing components or add new components.

The API 2060 (e.g., the API 145) is, for example, a collection of API programming functions, and may be provided in different configurations according to operation systems. For example, Android or iOS may provide one API set for each platform and Tizen may provide two or more API sets for each platform.

The applications 2070 (e.g., the application program 147) may include, for example, one or more applications that can execute, for example, the functions of home 2071, dialer 2072, SMS/MMS 2073, Instant Message (IM) 2074, browser 2075, camera 2076, alarm 2077, contact 2078, voice dial 2079, e-mail 2080, calendar 2081, media player 2082, album 2083, and watch 2084, health care (e.g., measurement of a quantity of motion, or blood sugar), or provision of environmental information (e.g., provision of atmospheric pressure, humidity, or temperature information).

According to one embodiment, the applications 2070 may include an application that supports information exchange between the electronic device (e.g., the electronic device 10) and the external electronic devices (e.g., the electronic devices 102 and 104) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 102 and 104). In addition, the notification relay application may receive notification information from, for example, an external electronic device, and may provide the notification information to the user.

The device management application may manage (e.g., install, delete, or update) at least one function of an external electronic device (e.g., the electronic device 102 or 104) that communicates with the electronic device (e.g., turn-on/turn-off of the external electronic device itself, (or some components thereof) or adjustment of brightness (or resolution) of a display), an application operated in the external electronic device, or a service provided by the external electronic device (e.g., a telephony service or a message service).

According to one embodiment, the applications 2070 may include an application designated according to an attribute of an external electronic device (e.g., the electronic device 102 or 104) (e.g., a healthcare application of a mobile medical device). According to one embodiment, the applications 2070 may include an application received from an external electronic device (e.g., the server 106 or the electronic device 102 or 104). According to one embodiment, the applications 2070 may include a preloaded application or a third party application that is capable of being downloaded from the server. The names of the components of the program module 2010 according to the illustrated embodiment may vary depending on the kind of operation system.

According to various embodiments, at least a portion of the program module 2010 may be implemented by software, firmware, hardware, or a combination of two or more thereof. At least a portion of the program module 2010 may be implemented (e.g., executed) by, for example, a processor (e.g., the processor 210). At least a portion of the program module 2010 may include, for example, a module, a program, a routine, a set of instructions, or a process for performing one or more functions.

The term "module" as used herein may, for example, mean a unit including one of hardware, software, and firmware or a combination of two or more of them. The "module" may be interchangeably used with, for example, the term in "unit", "logic", "logical block", "component", or "circuit". The "module" may be a minimum unit of an integrated component element or a part thereof The "module" may be a minimum unit for performing one or more functions or a part thereof The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device having a camera module, the electronic device comprising:
   a lens unit;
   a circuit board having a first opening;
   an image sensor carrier having an image sensor that moves in a first direction, the first direction is along an X, Y-axis;
   an optical image stabilization actuator coupled to the image sensor carrier to move the image sensor carrier in the first direction; and
   at least one auto focus (AF) actuator coupled to the image sensor to move the lens unit in a second direction, the second direction is along a Z-axis, and
   wherein the image sensor carrier comprises a receiving portion configured to receive the image sensor,
   wherein the receiving portion is coupled to the first opening and a second opening and a third opening of the optical image stabilization actuator such that the image sensor is received in the first opening.

2. The electronic device of claim 1, wherein the optical image stabilization actuator comprises:
   a first member fixed to the circuit board and having the second opening;
   a second member movably connected to the first member and having the third opening, and the second member is superimposed on the first member; and
   at least one control member connected to the first member and the second member, the control member controlling the second member in response to movement of the electronic device.

3. The electronic device of claim 2, further comprising:
   a base plate on a rear face of the circuit board to support the circuit board.

4. The electronic device of claim 1, further comprising:
   at least one magnet on the circuit board to seat the AF actuator and having the lens unit received therein on the image sensor carrier by a magnetic force, and to cause the image sensor carrier to be returned to a center position of the lens unit after the image sensor carrier is moved, and
   wherein the circuit board has at least one magnet seat portion coupled with the at least one magnet.

5. The electronic device of claim 3, further comprising:
   at least one ball member positioned between the second member and the base plate and located in a respective hole formed in the circuit board and the first member, and the at least one ball member is in contact with a rear face of the second member to support movement of the second member.

6. The electronic device of claim 2, wherein the image sensor carrier comprises:
   a sensor carrier main body;
   a support face formed around an outer periphery of the sensor carrier main body to face an upper outer peripheral face of the second member;
   the receiving portion having a recessed receiving space to receive the image sensor in the sensor carrier main body; and
   at least one bent portion formed between the sensor carrier main body and the receiving portion and bent to define the recessed receiving space.

7. The electronic device of claim 6, wherein the receiving portion comprises a sensor seat portion that seats the image sensor thereon.

8. The electronic device of claim 2, further comprising:
   a processor configured to:
      control a movement of the second member of the optical image stabilization actuator in a direction opposite to the first direction of movement of the electronic device using the control member of the optical image stabilization actuator in response to movement of the electronic device, control auto-focusing of the lens unit in the second direction using the AF actuator.

* * * * *